US 11,070,687 B2

(12) United States Patent
Shinya

(10) Patent No.: US 11,070,687 B2
(45) Date of Patent: Jul. 20, 2021

(54) IMAGE FORMING APPARATUS, CONTROL METHOD THEREOF AND STORAGE MEDIUM

(71) Applicant: CANON KABUSHIKI KAISHA, Tokyo (JP)

(72) Inventor: Takeshi Shinya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/921,139

(22) Filed: Jul. 6, 2020

(65) Prior Publication Data

US 2021/0014370 A1     Jan. 14, 2021

(30) Foreign Application Priority Data

Jul. 12, 2019   (JP) .............................. JP2019-130226

(51) Int. Cl.
*H04N 1/60* (2006.01)
*H04N 1/00* (2006.01)
*H04N 1/23* (2006.01)

(52) U.S. Cl.
CPC ....... *H04N 1/00411* (2013.01); *H04N 1/2338* (2013.01); *H04N 1/6072* (2013.01)

(58) Field of Classification Search
CPC ............. H04N 1/00411; H04N 1/6072; H04N 1/2338; H04N 1/6033
See application file for complete search history.

(56) References Cited

U.S. PATENT DOCUMENTS

| | | | | |
|---|---|---|---|---|
| 4,393,398 A * | 7/1983 | Horiguchi | ................ | H04N 1/46 101/211 |
| 5,493,321 A * | 2/1996 | Zwadlo | .................. | G03G 15/01 347/124 |
| 6,494,557 B1 * | 12/2002 | Kato | ...................... | B41J 2/2107 347/19 |
| 6,575,095 B1 * | 6/2003 | Mahy | ................... | H04N 1/6033 101/485 |
| 8,743,421 B1 * | 6/2014 | Ross, Jr. | .................. | H04N 1/54 358/1.9 |
| 8,786,898 B2 * | 7/2014 | Katayama | ............ | H04N 1/6058 358/1.9 |
| 2003/0016251 A1 * | 1/2003 | Kondo | ................. | H04N 1/6011 715/846 |
| 2003/0043424 A1 * | 3/2003 | Bhaskar | ............... | H04N 1/6033 358/518 |
| 2003/0112455 A1 * | 6/2003 | Ueda | .................... | H04N 1/6033 358/1.9 |
| 2005/0134852 A1 * | 6/2005 | Cumming | .......... | H04N 1/00068 356/402 |

(Continued)

FOREIGN PATENT DOCUMENTS

JP          2017-022648          1/2017

*Primary Examiner* — Ted W Barnes
(74) *Attorney, Agent, or Firm* — Venable LLP

(57) ABSTRACT

To make it unnecessary to repeat the same work in a case where a destination color is set for each of a plurality of adjustment-target colors within a printing-target image. A plurality of adjustment-target colors is set at a time for a printing-target image, a patch in a color having a desired tint is selected from among each similar color patch group for each adjustment-target color, and a destination color is determined, which is a conversion destination for each adjustment-target color.

15 Claims, 13 Drawing Sheets

(56) References Cited

U.S. PATENT DOCUMENTS

| | | | | |
|---|---|---|---|---|
| 2005/0157346 A1* | 7/2005 | Kitagawara | H04N 1/62 | 358/2.1 |
| 2005/0190390 A1* | 9/2005 | Yamada | H04N 1/6058 | 358/1.9 |
| 2005/0243339 A1* | 11/2005 | Kuhn | H04N 1/603 | 358/1.9 |
| 2006/0232771 A1* | 10/2006 | VanDuyn | H04N 1/6033 | 356/243.5 |
| 2008/0003547 A1* | 1/2008 | Woolfe | G06F 16/5838 | 434/98 |
| 2010/0085587 A1* | 4/2010 | Hayward | H04N 1/6033 | 358/1.9 |
| 2011/0058196 A1* | 3/2011 | Teraue | H04N 1/6033 | 358/1.9 |
| 2011/0058198 A1* | 3/2011 | Teraue | H04N 1/60 | 358/1.9 |
| 2011/0069332 A1* | 3/2011 | Katayama | H04N 1/6058 | 358/1.9 |
| 2011/0069333 A1* | 3/2011 | Katayama | H04N 1/6055 | 358/1.9 |
| 2011/0075223 A1* | 3/2011 | Katayama | H04N 1/6088 | 358/3.23 |
| 2011/0176157 A1* | 7/2011 | Katayama | H04N 1/6033 | 358/1.9 |
| 2011/0285777 A1* | 11/2011 | Goto | H04N 1/6033 | 347/15 |
| 2012/0050770 A1* | 3/2012 | Katayama | H04N 1/6033 | 358/1.9 |
| 2012/0075645 A1* | 3/2012 | Katayama | H04N 1/622 | 358/1.9 |
| 2012/0081722 A1* | 4/2012 | Katayama | G06K 15/1878 | 358/1.9 |
| 2013/0176326 A1* | 7/2013 | Safaee-Rad | H04N 21/4318 | 345/590 |
| 2016/0026905 A1* | 1/2016 | Arizono | H04N 1/52 | 358/3.06 |
| 2016/0156811 A1* | 6/2016 | Iwamoto | H04N 1/622 | 358/1.9 |
| 2016/0352972 A1* | 12/2016 | Kobayashi | H04N 1/648 | |
| 2018/0376032 A1* | 12/2018 | Tanaka | H04N 1/6072 | |
| 2019/0122395 A1* | 4/2019 | Fukasawa | H04N 1/46 | |
| 2019/0301941 A1* | 10/2019 | Kawabata | G01J 3/524 | |
| 2020/0267285 A1* | 8/2020 | Hioki | H04N 1/6044 | |
| 2020/0314290 A1* | 10/2020 | Yokouchi | G06T 7/90 | |

* cited by examiner

IMAGE FORMING APPARATUS, CONTROL METHOD THEREOF AND STORAGE MEDIUM

BACKGROUND OF THE INVENTION

Field of the Invention

The present disclosure relates to color adjustment of image data.

Description of the Related Art

At the time of printing an image, there is a case where it is desired to print the color at a specific position of the image in the same color as that of the sample. For example, at the time of printing an image including the logo of a company, there is a case where it is desired to print the logo in a specific color desired by a user. As regards this point, in a conventional printing apparatus, first, a user is caused to specify the above-described specific position in an image to be printed from now (printing-target image). Then, the printing apparatus recognizes the color (adjustment-target color) at the specific position specified by a user and prints a chart on which patches in the adjustment-target color and a plurality of similar colors resembling the adjustment-target color are arranged. A user visually checks a patch printed in the same color as that of the sample among the plurality of patches arranged on the chart and selects a patch in the color (destination color) having a tint the user him/herself desires. Upon receipt of the selection of a patch by a user, the printing apparatus generates a conversion table that converts the above-described adjustment-target color into the destination color, which is the color of the patch relating to the user selection. Then, by performing conversion processing using the conversion table for the printing-target image and performing printing, printed matter in which the adjustment-target color is reproduced in the destination color desired by the user is obtained.

In an actual use, there is a case where it is desired to change each of a certain plurality of adjustment-target colors into the individual destination color, in addition to a case of changing a certain adjustment-target color into a certain destination color. That is, there is a case where it is desired to change red into dark red, blue into light blue, and so on. However, in a case where it is desired to make such a change with the above-described conventional technique, it is necessary for a user to perform the same work repeatedly a plurality of times. That is, it is necessary to repeat the same work the number of times corresponding to the number of adjustment-target colors, such as specification of an adjustment-target color in a printing-target image→printing of a chart→selection of a chart→specification of an adjustment-target color→printing of a chart→selection of a patch→specification of an adjustment-target color . . . , and this is troublesome for a user.

SUMMARY I/F THE INVENTION

The control method of an image forming apparatus that forms an image based on an input image according to the present disclosure includes: a first display step of displaying a UI screen for causing a user to determine a first adjustment-target color and a second adjustment-target color different from the first adjustment-target color from among colors included in the input image; a forming step of forming a first patch group including patches in a plurality of colors similar to the first adjustment-target color and a second patch group including patches in a plurality of colors similar to the second adjustment-target color; a second display step of displaying a UI screen for causing a user to select one patch from among the formed first patch group and one patch from among the formed second patch group, respectively; and a determination step of determining a first destination color, which is a conversion destination of the first adjustment-target color, based on the one patch selected from among the first patch group and determining a second destination color, which is a conversion destination of the second adjustment-target color, based on the one patch selected from among the second patch group.

Further features of the present invention will become apparent from the following description of exemplary embodiments with reference to the attached drawings.

BRIEF DESCRIPTION I/F THE DRAWINGS

DESCRIPTION I/F THE EMBODIMENTS

Hereinafter, with reference to the attached drawings, the present disclosure is explained in detail in accordance with preferred embodiments. Configurations shown in the following embodiments are merely exemplary and the present invention is not limited to the configurations shown schematically.

First Embodiment

In the present embodiment, explanation is given by taking an MFP (Multi Function Peripheral) as an example, which is an image forming apparatus that forms an image on a printing medium, such as paper, in accordance with an input image, and comprises a scan function, a print function, a copy function, a transmission function, and the like. However, the application range of the technique of the present disclosure is not limited to the MFP and it is also possible to apply the technique widely to general apparatuses that output an image in accordance with an input image. That is, it is also possible to apply the technique to an image display device, such as a monitor and a projector, in addition to the image forming apparatus of another kind, such as a copy machine, a laser printer, an inkjet printer, and the like.

<Hardware Configuration of Image Forming Apparatus>

Figure 1:
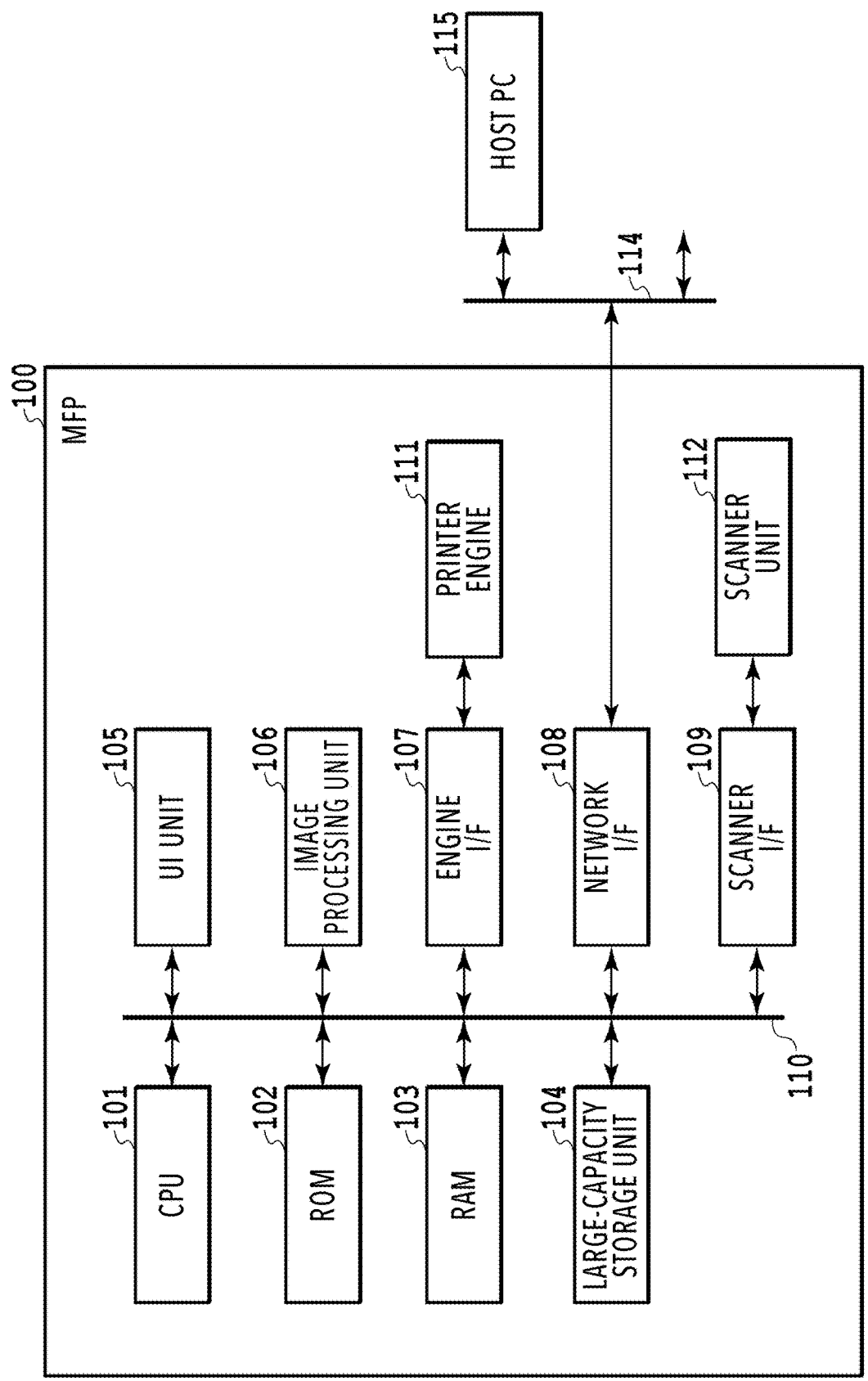
FIG. 1 is a block diagram showing a hardware configuration of an MFP.

FIG. 1 is a block diagram showing the hardware configuration of an MFP according to the present embodiment. An MFP 100 comprises a CPU 101, a ROM 102, a RAM 103, a large-capacity storage unit 104, a UI unit 105, an image processing unit 106, an engine I/F 107, a network interface (hereinafter, I/F) 108, and a scanner I/F 109. Each of these units is connected to one another via a system bus 110. Further, the MFP 100 further comprises a printer engine 111 and a scanner unit 112. The printer engine 111 and the scanner unit 112 are respectively connected to the system bus 110 via the engine I/F 107 and the scanner I/F 109. The image processing unit 106 may be configured as a device independent of the MFP 100.

The CPU 101 controls the operation of the entire MFP 100. The CPU 101 performs various kinds of processing, to be described later, by reading programs stored in the ROM 102 onto the RAM 103 and executing the programs. The ROM 102 is a read-only memory and stores a system boot program, programs for controlling the printer engine 111, character data, character code information, and the like. The RAM 103 is a volatile random access memory and used as a work area of the CPU 101 and a temporary storage area of various kinds of data. For example, the RAM 103 is used as a storage area for storing font data additionally registered by download, image files received from external devices, and the like. The large-capacity storage unit 104 is, for example, an HDD and an SSD and in which various kinds of data are spooled and is used for storing programs, lookup tables (LUTs), information files, image data, and the like, or used as a work area.

The UI (User Interface) unit 105 includes, for example, a liquid crystal display (LCD) comprising a touch panel function and displays the setting state of the MFP 100, the situation of processing currently being performed, error states, and the like. Further, the UI unit 105 receives a variety of user instructions, such as input of values in various settings of the MFP 100 and selection of various buttons. Input of necessary information at the time of performing adjustment of an LUT in the present embodiment is also performed via the UI unit 105. It may also be possible for the UI unit 105 to comprise an input device, such as a hard key, separately.

The image processing unit 106 generates image data that the printer engine 111 can process by performing predetermined image processing for printing-target image data that is input from an external device, such as a host PC 115. Details of the image processing unit 106 will be described later.

The engine I/F 107 functions as an interface for controlling the printer engine 111 in response to instructions from the CPU 101. Via the engine I/F 107, transmission and reception of engine control commands and the like are performed between the CPU 101 and the printer engine 111. The network I/F 108 functions as an interface for connecting the MFP 100 to a network 114. The network 114 may be, for example, a LAN or a public switched telephone network (PSTN). The printer engine 111 forms a multi-colored image using the toner of CMYK on a printing medium, such as paper, based on the printing-target image data received from the image processing unit 106 via the system bus 110. The scanner I/F 109 functions as an interface for controlling the scanner unit 112 in response to instructions from the CPU 101 at the time of reading a document by the scanner unit 112. Via the scanner I/F 109, transmission and reception of scanner unit control commands and the like are performed between the CPU 101 and the scanner unit 112. The scanner unit 112 generates read image data by optically reading a document by the control of the CPU 101 and transmits the image data to the RAM 103 or the large-capacity storage unit 104 via the scanner I/F 109.

<Details of Image Processing Unit>

Figure 2:
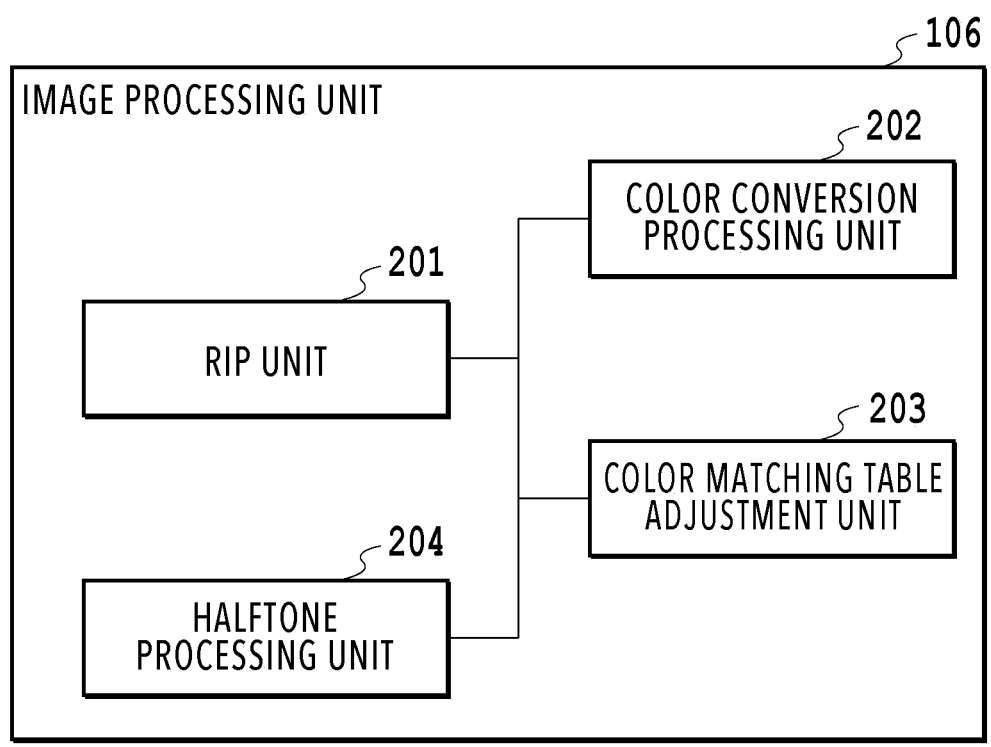
FIG. 2 is a functional block diagram showing an internal configuration of an image processing unit.

FIG. 2 is a functional block diagram showing the internal configuration of the image processing unit 106. The image processing unit 106 has a RIP (Raster Image Processor) unit 201, a color conversion processing unit 202, a color matching table adjustment unit 203, and a halftone processing unit 204. Each of these function units is implemented by the CPU 101 reading a program stored in the ROM 102 onto the RAM 103 and executing the program.

The printing-target image data that is processed in the image processing unit 106 is two-dimensional data including a plane for each color of red (R), green (G), and blue (B), representing, for example, a color signal corresponding to sRGB, which is a device independence color space, in 256 tones. Here, sRGB refers to the standard of the RGB color space defined by IEC (International Electrotechnical Commission). The printing-target image data may be data stored in the large-capacity storage unit 104, not limited to data received from the host PC 115. Further, the image processing unit 106 also generates image data on a similar color patch group used for chart printing, to be described later. In the following, each unit configuring the image processing unit 106 is explained.

The RIP unit 201 generates intermediate language data by analyzing the contents of the printing-target image data described in PDL, which is stored in the RAM 103, and further generates image data in units of pages represented in the bitmap format by rasterizing the intermediate language data.

The color conversion processing unit 202 performs processing to convert the image data (raster image data) in units of pages generated by the RIP unit 201 into image data in a color space corresponding to the printer engine 111 by using an LUT in accordance with the purpose thereof. Specifically, first, the color conversion processing unit 202 performs processing (color matching processing) to convert the color space of the raster image data from device-independent sRGB into device-dependent RGB (hereinafter, described as "devRGB") by using a color matching table as shown in Table 1 below.

TABLE 1

| Input (sRGB) | | | Output (devRGB) | | |
|---|---|---|---|---|---|
| R | G | B | R | G | B |
| 0 | 0 | 0 | 0 | 0 | 0 |
| 0 | 0 | 175 | 0 | 0 | 173 |
| 0 | 0 | 191 | 0 | 0 | 189 |
| 0 | 0 | 207 | 0 | 0 | 203 |
| 0 | 0 | 223 | 0 | 0 | 219 |
| 0 | 0 | 239 | 0 | 0 | 235 |

TABLE 1-continued

| Input (sRGB) | | | Output (devRGB) | | |
|---|---|---|---|---|---|
| R | G | B | R | G | B |
| 0 | 0 | 255 | 0 | 0 | 248 |
| 0 | 16 | 0 | 0 | 15 | 0 |

As shown in Table 1 described above, the color matching table stores an input value and an output value in association with each other at a plurality of discrete points (corresponding to grid points, to be described later) within the color space.

Further, the color conversion processing unit 202 performs processing (color conversion processing) to convert devRGB into color materials (here, CMYK) used in the printer engine 111 by using a color conversion table prepared separately. At this time, devRGB is temporarily converted into Lab by using a color conversion table in which devRGB and Lab are associated with each other and further, Lab is converted into CMYK by using a color conversion table in which Lab and CMYK are associated with each other. Lab refers to a three-dimensional visual uniform color space independent of the printer engine 111, which is defined by CIE (International Lighting Commission) and which takes into consideration the human visual characteristic. In the present embodiment, the conversion from sRGB into CMYK is performed in three stages by using a total of three LUTs, but this is not limited. For example, it may also be possible to covert sRGB into CMYK at a time by using an LUT obtained by integrating the above-described three LUTs into one LUT. The image data after the conversion into CMYK is sent to the halftone processing unit 204.

The color matching table adjustment unit 203 adjusts the conversion characteristic in the above-described color matching table based on user instructions via the UI unit 105. In the present embodiment, the color matching table adjustment unit 203 performs adjustment processing to change the conversion characteristic in the existing color matching table so that a specific adjustment-target color within a printing-target image is converted into a destination color having a tint desired by a user in the color matching processing. Then, by using a new color matching table generated by the adjustment processing, processing to convert an sRGB image signal into a devRGB image signal is performed. Due to this, a color of a tint intended by a user is implemented in printing results.

The halftone processing unit 204 converts multi-valued (for example, eight bits) image data after the color conversion processing into halftone image data represented by the number of tones (for example, two bits) that can be represented by the printer engine 111 by performing halftone processing for each color of CMYK. As the halftone processing, it is possible to apply a variety of methods, such as the density pattern method, the systematic dither method, and the error diffusion method, The generated halftone image data for each color plane of CMYK is provided to the printer engine 111 via the engine I/F 107.

Here, explanation is given on the assumption that each of the above-described function units is implemented by the CPU 101 executing the predetermined program, but it may also be possible to implement a part or all of the function units by an ASIC or dedicated hardware. Further, it may also be possible to have, as the component of the image processing unit 106, a density correction unit configured to perform correction so that a relationship between each tone value of the CMYK image data after the color conversion and the density that is output onto paper by the printer engine 111 becomes a desired relationship.

<Details of Color Matching Table Adjustment Unit>

Figure 3:
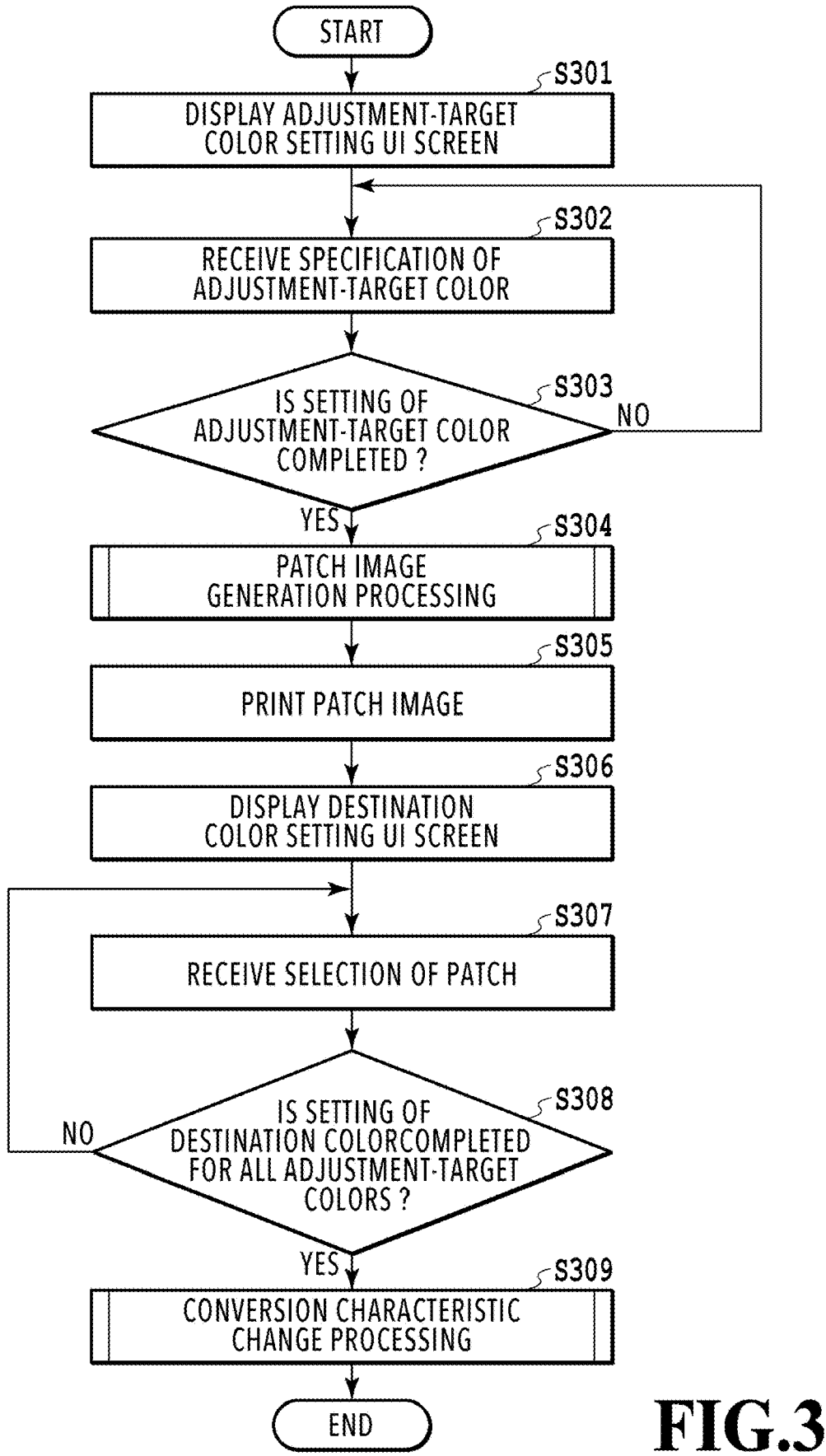
FIG. 3 is a flowchart showing a flow of processing in a color matching table adjustment unit.

Following the above, the processing in the color matching table adjustment unit 203 according to the present embodiment is explained in detail. FIG. 3 is a flowchart showing the flow of the processing in the color matching table adjustment unit 203. In the following explanation, symbol "S" represents a step. In the following, explanation is given along the flowchart shown in FIG. 3.

Figure 4A:
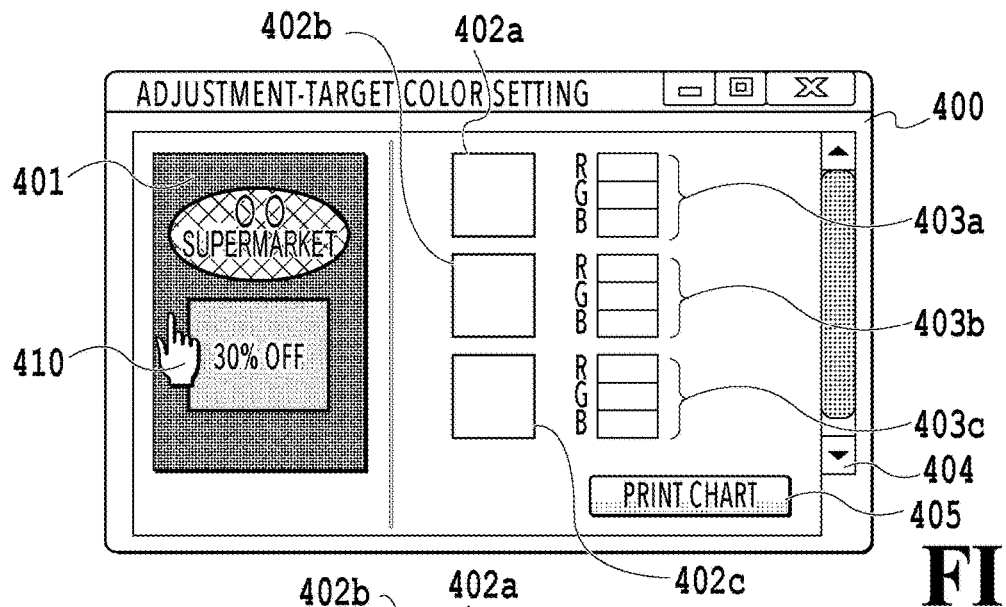
FIG. 4A to FIG. 4C are each a diagram showing an example of an adjustment-target color setting UI screen according to a first embodiment.

At S301, a user inter face screen (adjustment-target color setting screen) on which a user can specify a plurality of adjustment-target colors en bloc among information necessary for adjustment of the color matching table is displayed on the UI unit 105. FIG. 4A shows the initialization state on an adjustment-target color setting screen according to the present embodiment. In a preview area 401 on an adjustment-target color setting screen 400, a printing-target image is preview-displayed. In a case where a user specifies a desired adjustment-target color portion for the preview-display image by a touch operation or the like, on the right side of the preview area 410, color samples 402a to 402c of the specified adjustment-target colors are displayed. Here, the color sample is a square image in a uniform color and is an image in which all the pixels have the RGB values of the adjustment-target color. Then, on the right side of the color sample 402a, RGB values 403a of the color in the sRGB color space are displayed, which is specified as the first adjustment-target color. Similarly, on the right side of the color sample 402b, RGB values 403b of the color in the sRGB color space are displayed, which is specified as the second adjustment-target color, and on the right side of the color sample 402c, RGB values 403c of the color in the sRGB color space are displayed, which is specified as the third adjustment-target color. Further, at the right end on the adjustment-target color setting screen, a scroll bar 404 exists and it is also possible to further specify more adjustment-target colors. As described above, the adjustment-target color setting screen 400 of the present embodiment is configured so as to be capable of specifying a plurality of adjustment-target colors en bloc at a time. A "Print chart" button 405 is a button for giving instructions to print a chart including a patch image group for each adjustment-target color.

Figure 4B:
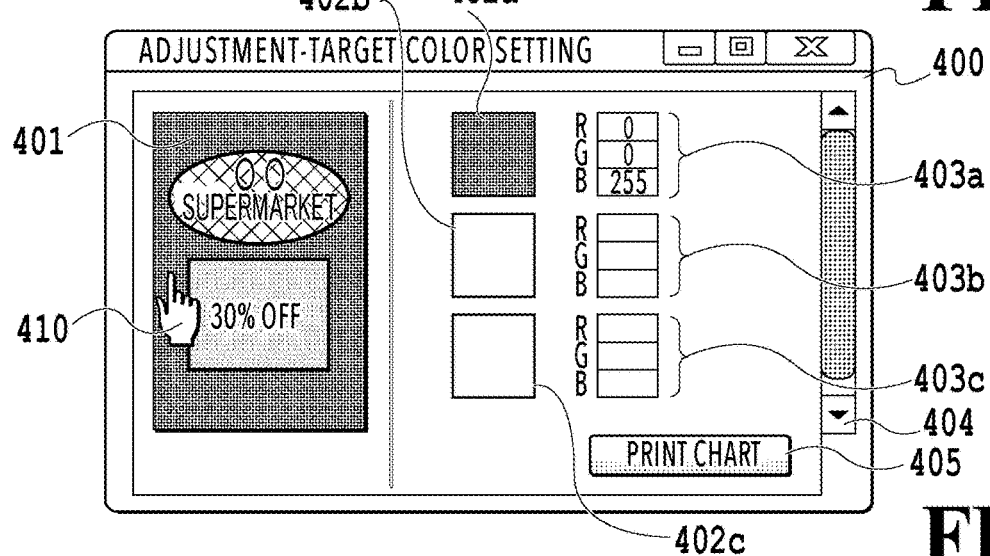

At S302, specification of an adjustment-target color is received. Specifically, in a case where a touch operation or the like by a user to the printing-target image currently being preview-displayed is detected, the sRGB values at the position at which the touch operation is performed are acquired. Then, as described above, the color sample having the acquired sRGB values of the adjustment-target color is displayed within the adjustment-target color setting screen 400. Here, it is assumed that the first adjustment-target color is specified by a user performing the touch operation to the background portion of the preview-displayed printing-target image as indicated by a finger cursor 410 in FIG. 4A. In this case, as shown in FIG. 4B, the color sample 402a corresponding to the color at the position at which the touch operation is performed is displayed and to the right thereof, the sRGB values 403a of the color are displayed. In FIG. 4B, the sRGB values 403a are R=0, G=0, and B=255, and therefore, the color having only the blue component is specified as the adjustment-target color and the color sample 402a thereof is displayed.

Figure 4C:
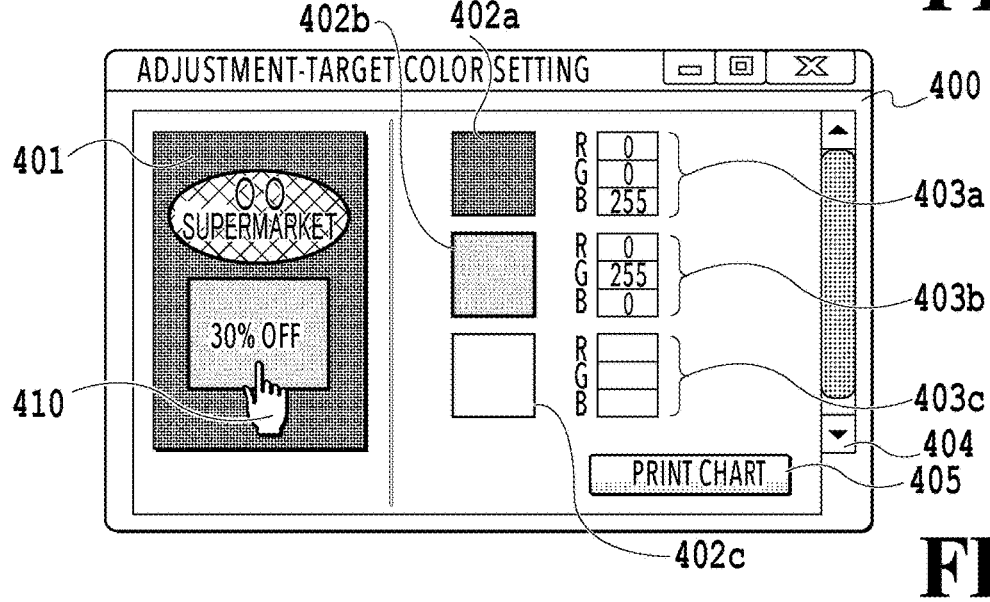

At S303, whether a user has specified another adjustment-target color is determined. For example, it is assumed that a user has specified the second adjustment-target color for the graphics portion including the characters "30% off" of the preview-displayed printing-target image as indicated by the finger cursor 410 in FIG. 4C. In this case, the color sample 402b corresponding to the color of the graphics portion to which the touch operation has been performed is displayed and to the right thereof, the sRGB values 403b of the color are displayed. In FIG. 4C, the sRGB values 403b are R=0, G=255, and B=0, and therefore, the color having only the green component is specified as the adjustment-target color and the color sample 402b thereof is displayed. On the other hand, in a case where the Print chart button 405 has been pressed down by a user who has completed specification of the adjustment-target color, the processing advances to S304. In a case where the Print chart button 405 is pressed down, information on all the specified adjustment-target colors is stored in the RAM 103.

At S304, for each of the adjustment-target colors specified by a user, processing to generate patch image data in which patches in a plurality of colors similar to the adjustment-target color are arranged is performed (hereinafter, called "patch image generation processing"). In this case, on a condition that a user has specified two adjustment-target colors, in the patch image data, a set of patches in a plurality of colors similar to the first adjustment-target color and a set of patches in a plurality of colors similar to the second adjustment-target color are included. In the following, a patch in a color similar to the adjustment-target color is called "similar color patch" or simply "patch" and a set in units of adjustment-target colors is called "similar color patch group". Details of the patch image generation processing will be described later.

Figure 5:
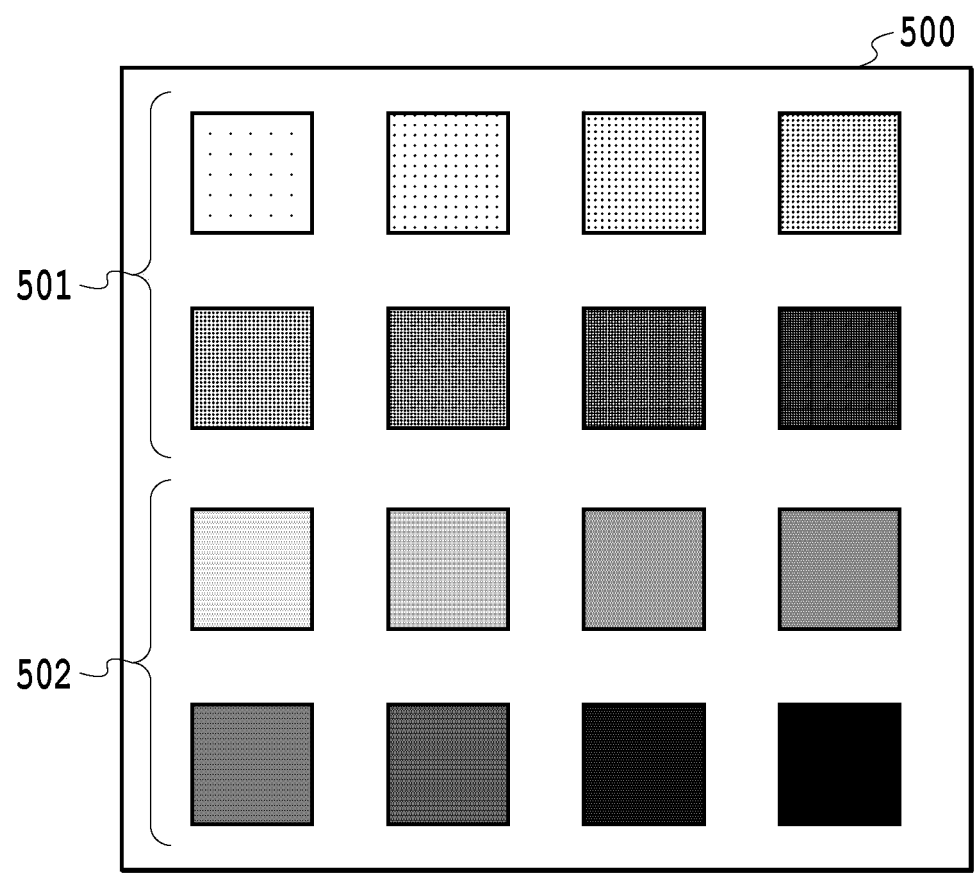
FIG. 5 is a diagram showing an example of a chart on which a similar color patch group is arranged for each adjustment-target color.

At S305, instructions to print the patch image data generated at S304 are given to the printer engine 111. The printer engine 111 having received the print instructions prints and outputs the patch image data. Due to this, a chart on which similar color patch groups are arranged for each adjustment-target color is obtained. FIG. 5 shows an example of a chart on which similar color patch groups corresponding to the number of adjustment-target colors are arranged, which is obtained at this step. In a similar color patch group 501, eight similar color patches corresponding to the first adjustment-target color are included and in a similar color patch group 502, eight similar color patches corresponding to the second adjustment-target color are included. Each similar color patch configuring the similar color patch group 501 has a color similar to the first adjustment-target color respectively and the color is slightly different between patches. Similarly, each similar color patch configuring the similar color patch group 502 has a color similar to the second adjustment-target color respectively and the color is slightly different between patches.

Figure 6A:
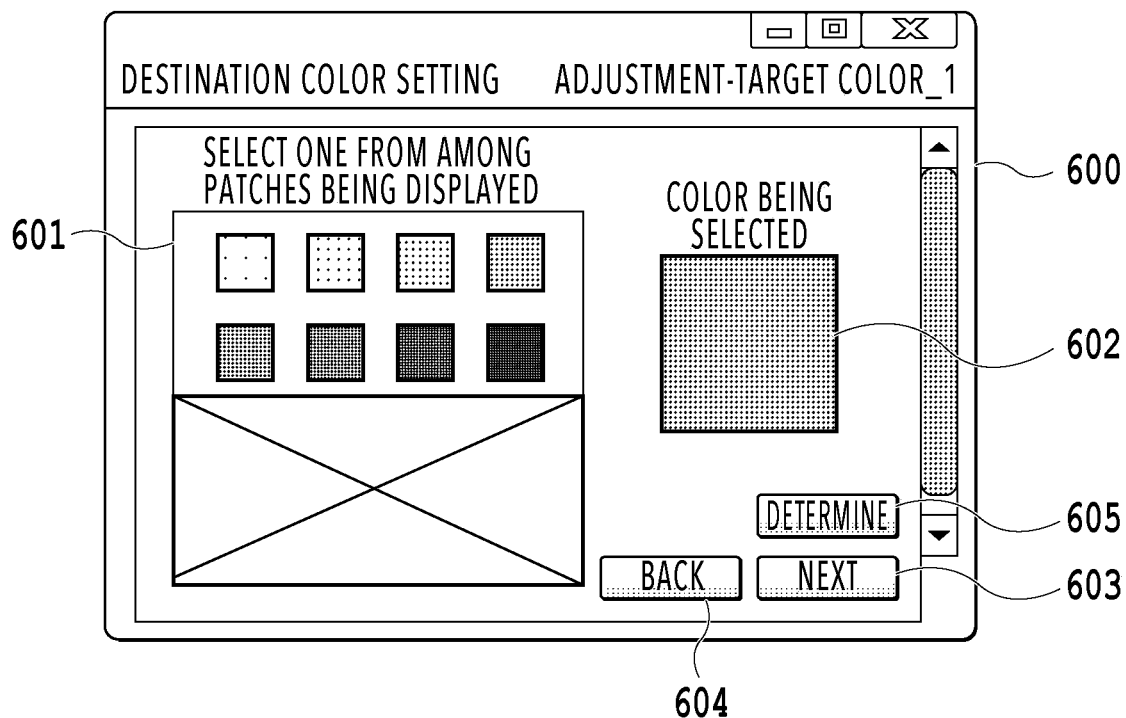
FIG. 6A and FIG. 6B are each a diagram showing an example of a destination color setting UI screen according to the first embodiment.
Figure 6B:
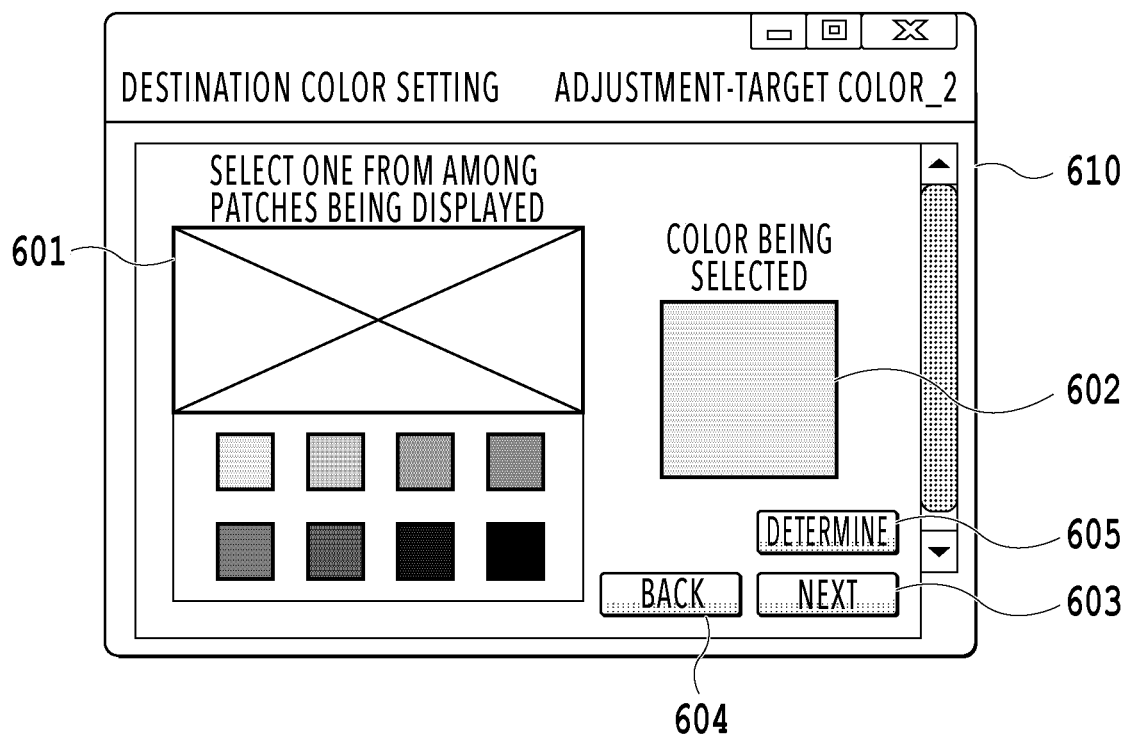

At S306, a UI screen (destination color setting screen) for specifying the destination color described above, which is the conversion destination of each adjustment-target color, is displayed on the UI unit 105. FIG. 6A and FIG. 6B each show an example of the destination color setting screen according to the present embodiment. A destination color setting screen 600 in FIG. 6A is a UI screen for specifying a destination color, which is the conversion destination of the first adjustment-target color shown in FIG. 4B described previously. Further, a destination color setting screen 610 in FIG. 6B is a UI screen for specifying a destination color, which is the conversion destination of the second adjustment-target color shown in FIG. 4C described previously.

At S307, specification of a destination color by patch selection is received. First, a case is explained where a destination color regarding the first adjustment-target color is set on the destination color setting screen 600 shown in FIG. 6A, Here, on the upper half side of a preview area 601 on the destination color setting screen 600, among all the patch images used for printing of the chart, only the portion of the similar color patch group 501 is preview-displayed. Then, the lower half side of the preview area 601 is grayed out (represented by x in FIG. 6A) or the like so that a user cannot select the similar color patch group 502. In a case where a user selects the patch in the desired color from among the plurality of similar color patches currently being preview-displayed by a touch operation or the like, the color sample of the color of the selected patch is displayed as the destination color of the first adjustment-target color. Until the patch of the color, which is the destination color, is selected by a user, the color sample of the first adjustment-target color is displayed. In a case where specification of the destination color of the first adjustment-target color is completed and a user presses down a "Next" button 603, the screen makes a transition into the destination color setting screen 610. On the lower half side of the preview area 601 on the destination color setting screen 610 shown in FIG. 6B, among all the patch images used for printing of the chart, only the portion of the similar color patch group 502 is preview-displayed. Then, the upper half side of the preview area 901 is grayed out (represented by x in FIG. 6B) so that a user cannot select the similar color patch group 501. On the destination color setting screen 610 such as this, a user specifies the destination color of the second adjustment-target color by the same procedure as that for the first adjustment-target color. A "Back" button 604 on the destination color setting screens 600 and 610 is a button to return the screen display to the destination color setting screen for the one previous adjustment-target color. A user having completed the setting of the destination colors for all the adjustment-target colors presses down a "Determine" button 605.

At S308, whether or not the setting of the destination color is completed for all the adjustment-target colors is determined. Specifically, whether or not the above-described "Determine" button 605 is pressed down is determined and in a case where pressing down of the "Determine" button 605 is detected, the processing advances to S309.

At S309, processing to change the conversion characteristic in the color matching table based on the destination color for each adjustment-target color, which is set at S307, is performed. Details of the conversion characteristic change processing will be described later.

The above is the rough flow of the processing in the color matching table adjustment unit 203.

<Details of Patch Image Generation Processing>

Following the above, details of the patch image generation processing at S304 described above are explained with reference to the flowchart shown in FIG. 7. At S701, the number of patches per adjustment-target color is calculated. First, information on a number of patches $P_N$ to be arranged on the same surface of the same page is acquired from the ROM 102 or the like. This number of patches $P_N$ is determined in advance and stored in the ROM 102 or the like. Further, information on a current number of pages $P_{CNT}$ is acquired from the RAM 103. The initial value of the current number of pages $P_{CNT}$ is "1" and the number of pages $P_{CNT}$ is a variable for determining the number of pages on which the patch image is printed. Then, a total number of patches $P_{SUM}$ is found by multiplying the number of patches $P_N$ to be arranged on the same page and the current number of pages $P_{CNT}$. The total number of patches $P_{SUM}$ is expressed by formula (1) below.

$$P_{SUM} = P_N \times P_{CNT} \quad \text{formula (1)}$$

Then, a number of patches P per adjustment-target color is found by dividing the total number of patches $P_{SUM}$ by a total number of adjustment-target colors $C_N$. In this case, as the information on the total number of adjustment-target colors $C_N$, information stored in the RAM 103 in the determination processing at S303 described previously is used. The number of patches P per adjustment-target color is expressed by formula (2) below.

$$P_{SUM}/C_N \quad \text{formula (2)}$$

At S702, whether or not the number of patches P per adjustment-target color, which is calculated at S701, is larger than or equal to a predetermined threshold value is determined. Here, the predetermined threshold value is a number of similar patches (minimum number of patches) $P_{MIN}$, which are desired to be secured at the minimum for one adjustment-target color and as the minimum number of patches $P_{MIN}$, one stored in the ROM 102 or the like is used. In a case where determination results indicate that the number of patches P per adjustment-target color, which is calculated at S701, is larger than or equal to the minimum number of patches $P_{MIN}$, the processing advances to S704. On the other hand, in a case where the number of patches P per adjustment-target color is less than the minimum number of patches $P_{MIN}$, the processing advances to S703 and the value of the current number of pages $P_{CNT}$ is incremented (+1) and the processing returns to S701. Here, it is assumed that the minimum number of patches $P_{MIN}$ per color is set to five. In this case, on a condition that the number of patches P per adjustment-target color, which is calculated at S701, is larger than or equal to "five", the processing advances to S704 and on a condition that it is less than "five", the processing advances to S703 to increase the number of pages. For example, in a case where it is assumed that the number of patches $P_N$ to be arranged on the same page is set to 16, the total number of patches $P_{SUM}$ on the first page is 16. Then, in a case where it is determined that the total number of adjustment-target colors $C_N$ is two, at S701, the number of patches P per adjustment-target color is obtained as eight by dividing 16 by 2. In this case, the predetermined threshold value "five" is exceeded and it is not necessary to increase the number of pages, and therefore, the processing to S704 without performing anything.

At S704, for the adjustment-target color of interest among the adjustment-target colors specified by a user, a plurality of similar color patches whose lightness and hue are changed stepwise is determined. For the determination of the similar color patch, for example, an LUT as shown in Table 2 below is used, in which the sRGB values and the Lab values are associated with each other.

TABLE 2

| Input (sRGB) | | | Output | | |
|---|---|---|---|---|---|
| R | G | B | L | a | b |
| 0 | 0 | 0 | 0 | 0 | 0 |
| 0 | 0 | 16 | 0 | 2 | −6 |
| 0 | 0 | 32 | 1 | 6 | −17 |
| 0 | 0 | 255 | 32 | 79 | −107 |
| 0 | 16 | 0 | 3 | −7 | 5 |
| 0 | 255 | 0 | 88 | −86 | 83 |

TABLE 2-continued

| Input (sRGB) | | | Output | | |
|---|---|---|---|---|---|
| R | G | B | L | a | b |
| 16 | 0 | 0 | 1 | 4 | 2 |
| 255 | 255 | 255 | 100 | 0 | 0 |

In the present embodiment, it is assumed that the Lab values in Table 2 described above take a real value and L takes a value between 0.0 and 100.0 and a and b take a value between −127.0 and 128.0. In a case where the sRGB values that do not exist in the above-described LUT are specified, it is sufficient to find the Lab values by the interpolation calculation using peripheral values. Details of the similar color patch determination method will be described later.

At S705, whether or not the determination of the similar color patch is completed for all the adjustment-target colors specified by a user is determined. In a case where the determination of the similar color patch is completed for all the adjustment-target colors, the processing advances to S706. On the other hand, in a case where there is an unprocessed adjustment-target color, the processing returns to S704 and the next adjustment-target color of interest is determined and the same processing is repeated.

At S706, based on the number of patches $P_N$ to be arranged on the same surface of the same page, patch image data including the similar color patch groups determined for each adjustment-target color at S704 is generated.

<Determination Method of Similar Color Patch>

Next, the determination method of the similar color patch at S704 is explained. First, the Lab values corresponding to the sRGB values of the adjustment-target color of interest are acquired by referring to the LUT of Table 2 described above. Next, from the acquired Lab values, a hue angle h is found by using formula (3) below.

$$h = \tan^{-1} b/a \quad \text{formula (3)}$$

Following the above, a lightness change amount $\Delta L$ and a hue angle change amount $\Delta h$ between each similar color patch are found by using formula (4) below.

$$\Delta L = L_{NORM}/P, \Delta h = h_{NORM}/P \quad \text{formula (4)}$$

In formula (4) described above, $L_{NORM}$ indicates the maximum change amount of the lightness and $h_{NORM}$ indicates the maximum change amount of the hue angle. As the maximum change amount $L_{NORM}$ of the lightness and the maximum change amount $h_{NORM}$ of the hue angle, those determined in advance and stored in the ROM 102 or the like are used. Further, in formula (4) described above, P indicates the number of patches per adjustment-target color, which is found at S701.

Next, lightness $L_N$ and a hue angle $h_N$ of the similar color patch group are found by using formula (5) and formula (6) below, respectively.

$$L_N = L + \Delta L \times N \quad \text{formula (5)}$$

$$h_N = h + \Delta h \times N \quad \text{formula (6)}$$

In formula (5) described above, L indicates the lightness of the adjustment-target color of interest. Further, in formula (6) described above, h indicates the hue angle of the adjustment-target color of interest. Further, in formula (5) and formula (6) described above, N is a variable that takes a value not less than 1 and not more than P.

Next, based on the lightness $L_N$ and the hue angle $h_N$ of the similar color patch group, which are found as described above, $a_N$ and $b_N$ indicating chromaticity (hue and saturation) in each similar color patch are found by using formula (7) and formula (8) below.

$$a_N = C \cos h_N \quad \text{formula (7)}$$

$$b_N = C \sin h_N \quad \text{formula (8)}$$

Then, the values of $L_N$, $a_N$, and $b_N$ (hereinafter, described as "$L_N a_N b_N$ values") of each similar color patch obtained as described above are converted into the values of $R_N$, $G_N$, and $B_N$ (hereinafter, described as "$R_N G_N B_N$ values") in the sRGB color space. This conversion is performed by signal search processing using the LUT of Table 2 described previously. In the signal search processing, for example, all the combinations of the signal values from 0 to 255 of the RGB values in sRGB are taken as an input and tetrahedral interpolation is performed by using the LUT of Table 2 as a calculation table. Then, from among all the Lab values obtained by the tetrahedral interpolation, the Lab values closest to the $L_N a_N b_N$ values of each similar color patch are extracted, respectively. The sRGB values corresponding to the Lab values thus extracted are determined as the $sR_N G_N B_N$ values of each similar color patch. In the present embodiment, the signal search processing is used, but the conversion is not limited to this. For example, it may also be possible to convert the $L_N a_N b_N$ values of each similar color patch into the $sR_N G_N B_N$ values by using an inverse LUT (Lab→sRGB conversion table) of the LUT of Table 2.

As a result of the processing as described above, for example, a similar color patch group as shown in Table 3 below is obtained for the adjustment-target color of interest.

TABLE 3

| Patch No. | R | G | B | L | a | b |
|---|---|---|---|---|---|---|
| 1 | 2 | 2 | 255 | 32 | 79 | −108 |
| 2 | 0 | 0 | 250 | 35 | 34 | −67 |
| 3 | 1 | 1 | 254 | 20 | 42 | −63 |
| 4 | 2 | 3 | 253 | 52 | 30 | −59 |
| 5 | 0 | 5 | 252 | 39 | 16 | −52 |
| 6 | 6 | 5 | 254 | 40 | 35 | −80 |
| 7 | 4 | 7 | 251 | 21 | 38 | −92 |
| 8 | 10 | 10 | 249 | 26 | 63 | −103 |

In the present embodiment, a similar color patch group in which lightness and saturation are made to differ by an equal interval, but the present embodiment is not limited to this. It may also be possible to make lightness and saturation differ by an unequal interval by determining the number of patches P per adjustment-target color in view of the knowledge of a user for color and the time a user can spend for adjustment.

<Details of Conversion Characteristic Change Processing>

Figure 8:
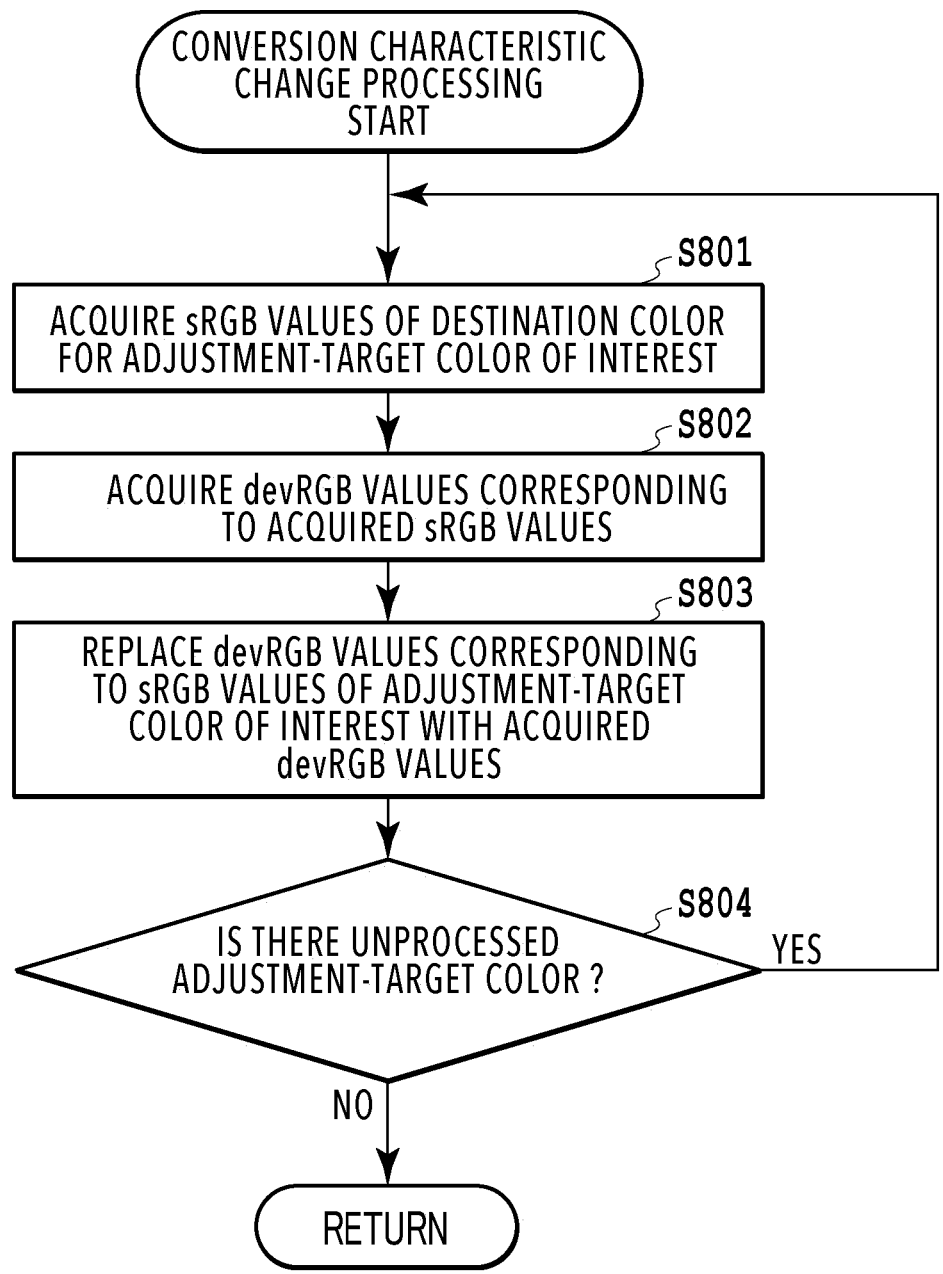
FIG. 8 is a flowchart showing details of conversion characteristic change processing.

Following the above, details of the processing to change the conversion characteristic of the color matching table at S309 described above are explained with reference to the flowchart shown in FIG. 8.

At S801, the sRGB values of the destination color set for the adjustment-target color of interest (that is, sRGB values of the patch selected from among the similar color patch group) are acquired. At S802 that follows, the color matching table stored in the large-capacity storage unit 104 is read and the devRGB values corresponding to the sRGB values of the destination color acquired at S801 are acquired. In a case where the sRGB values of the destination color acquired at S801 are not stored in the color matching table, as described previously, the corresponding devRGB values are calculated by the interpolation calculation using the peripheral values.

At S803, the conversion characteristic of the adjustment-target color of interest in the read color matching table described above is changed. Specifically, the processing to rewrite the devRGB values corresponding to the sRGB values of the adjustment-target color of interest stored in the color matching table with the devRGB values acquired at S802 is performed. Here, how the conversion characteristic is changed is explained by taking a case of the color matching table of Table 1 described previously as an example. Here, it is assumed that the adjustment-target color of interest is the color whose sRGB values are (0, 0, 255) and for the color, a patch whose Patch No. is "5" in Table 3 described previously is selected, and a color whose sRGB values are (0, 5, 252) and whose tint is different is set as the destination color. In this case, first, at S801, (0, 5, 252) are acquired. Next, the devRGB values corresponding to the sRGB values are acquired from the color matching table shown in Table 1 described previously, but the point corresponding to (0, 5, 252) is not stored, and therefore, the devRGB values are found by the interpolation calculation. Here, it is assumed that the devRGB values=(0, 5, 245) of the destination color are calculated by the interpolation calculation. In the case of this specific example, at this step, (0, 0, 248) stored as the devRGB values corresponding to the sRGB values (0, 0, 255) of the adjustment-target color of interest are rewritten to the devRGB values=(0, 5, 245) of the destination color calculated at S802. That is, the color matching table shown in Table 1 described previously, which is stored in the large-capacity storage unit 104, is changed and updated as in Table 4 below.

TABLE 4

| Input (sRGB) | | | Output (devRGB) | | |
|---|---|---|---|---|---|
| R | G | B | R | G | B |
| 0 | 0 | 0 | 0 | 0 | 0 |
| 0 | 0 | 175 | 0 | 0 | 173 |
| 0 | 0 | 191 | 0 | 0 | 189 |
| 0 | 0 | 207 | 0 | 0 | 203 |
| 0 | 0 | 223 | 0 | 0 | 219 |
| 0 | 0 | 239 | 0 | 0 | 235 |
| 0 | 0 | 255 | 0 | 245 | 248 |
| 0 | 16 | 0 | 0 | 15 | 0 |

At S804, whether or not the change of the conversion characteristic described above is completed for all the adjustment-target colors specified by a user is determined. In a case where there is an unprocessed adjustment-target color, the processing returns to S801 and the next adjustment-target color of interest is determined and the same processing is continued. In a case where the change of the conversion characteristic is completed for all the adjustment-target colors, this processing is exited.

The above is the contents of the conversion characteristic change processing of the color matching table. In the present embodiment, only the values of one grid point corresponding to the adjustment-target color are changed, but the present embodiment is not limited to this. For example, it may also be possible to perform smoothing processing for each output value after the change so that the difference between the output value of the grid point indicated by the destination color on the RGB color space and the output value of the grid point in the vicinity thereof changes smoothly.

According to the present embodiment, in a case where it is desired to change the tint of a plurality of adjustment-target colors within a printing-target image, it is possible to specify a plurality of adjustment-target colors at a time and set the destination color of each adjustment-target color by viewing a chart on which similar color patch groups of the plurality of adjustment-target colors are formed. Due to this, it is possible to save the effort and time of a user, and therefore, convenience improves. Further, on the chart, the similar color patch groups of a plurality of adjustment-target colors are arranged, and therefore, it is possible to save the number of pages of the chart, resulting in a reduction in the cost required for chart printing.

Second Embodiment

In the first embodiment, a similar color patch group is generated for each of a plurality of adjustment-target colors and a chart on which the similar color patch groups are arranged in order is printed and output. In this case, depending on the number of patches per adjustment-target color, it may happen that a similar color patch group for one adjustment-target color is printed across different pages.

Figure 9A:
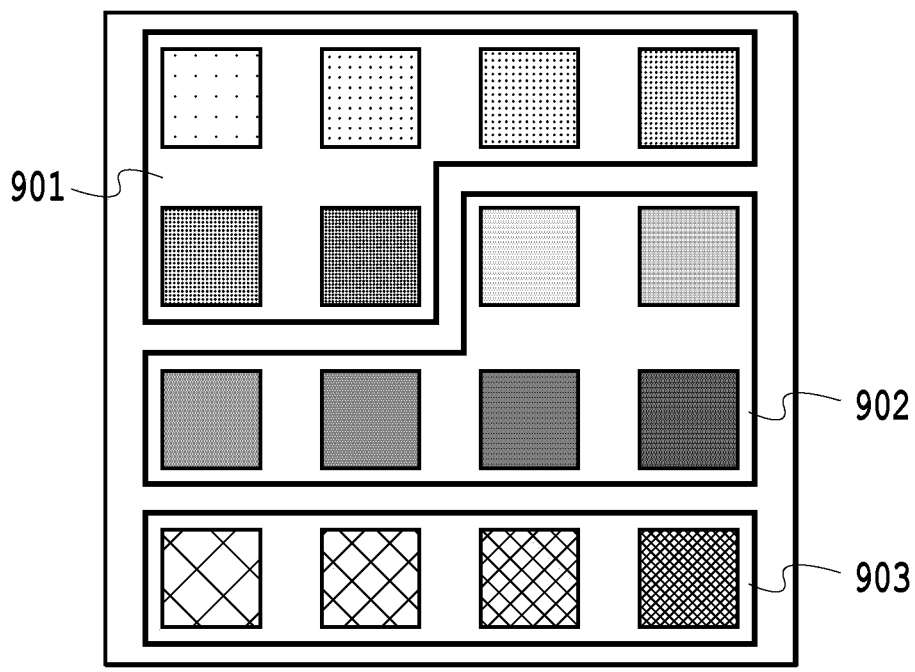
FIG. 9A and FIG. 9B are diagrams explaining the way a similar color patch group of the same adjustment-target color is output across two pages.
Figure 9B:
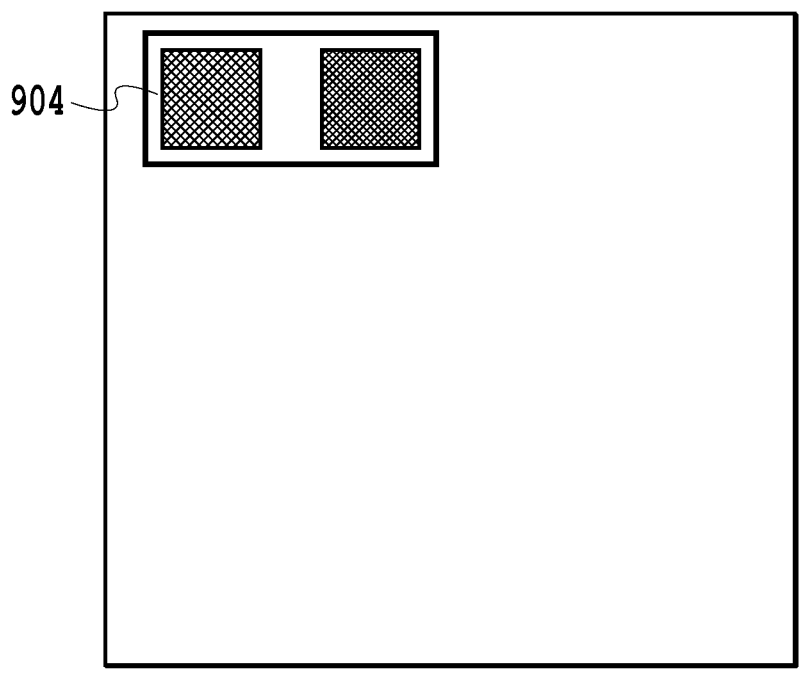

Here, explanation is given by using a specific example. Here, it is assumed that the total number of adjustment-target colors $C_N$ is three, the number of patches $P_N$ to be arranged on the same surface of the same page is 16, and the minimum number of patches $P_{MIN}$ per adjustment-target color is six. In this case, as shown in FIG. 9A and FIG. 9B, the chart is printed and output separately on two pages. FIG. 9A is the first page of the chart and FIG. 9B is the second page of the chart. In FIG. 9A, a surrounding frame 901 indicates the similar color patch group corresponding to a first adjustment-target color, a surrounding frame 902 indicates the similar color patch group corresponding to a second adjustment-target color, and a surrounding frame 903 indicates the similar color patch group corresponding to a third adjustment-target color. Then, in FIG. 9B, a surrounding frame 904 indicates remaining patches that are not included on the first page among the patches configuring the similar color patch group corresponding to the third adjustment-target color. As described above, in the case of the first embodiment, depending on conditions, the similar color patch group for the same adjustment-target color is not included within the same page and it may happen that printing is performed across different pages. Consequently, an aspect is explained as a second embodiment, in which the similar color patch group for one adjustment-target color is arranged within the same page.

Figure 7:
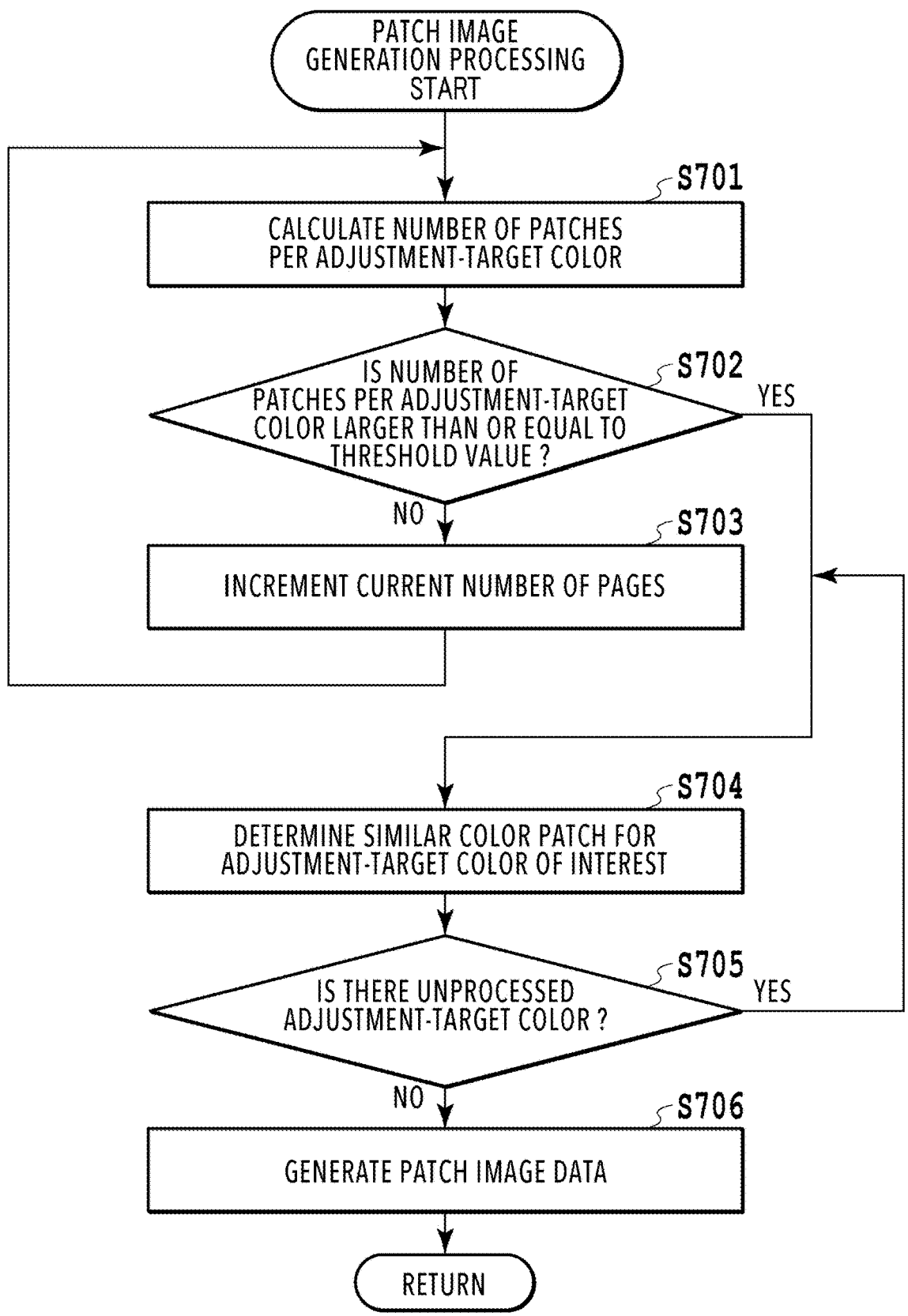
FIG. 7 is a flowchart showing details of patch image generation processing.

The feature of the present embodiment is that control is performed so that the similar color patch group for one adjustment-target color is arranged within the same page in the generation processing (S706) of the patch image data in the flowchart in FIG. 7 described previously. Consequently, in the following, patch arrangement control at the time of generation of patch image data is explained and explanation of other contents in common to those of the first embodiment is omitted.

<Patch Arrangement Control>

Figure 10:
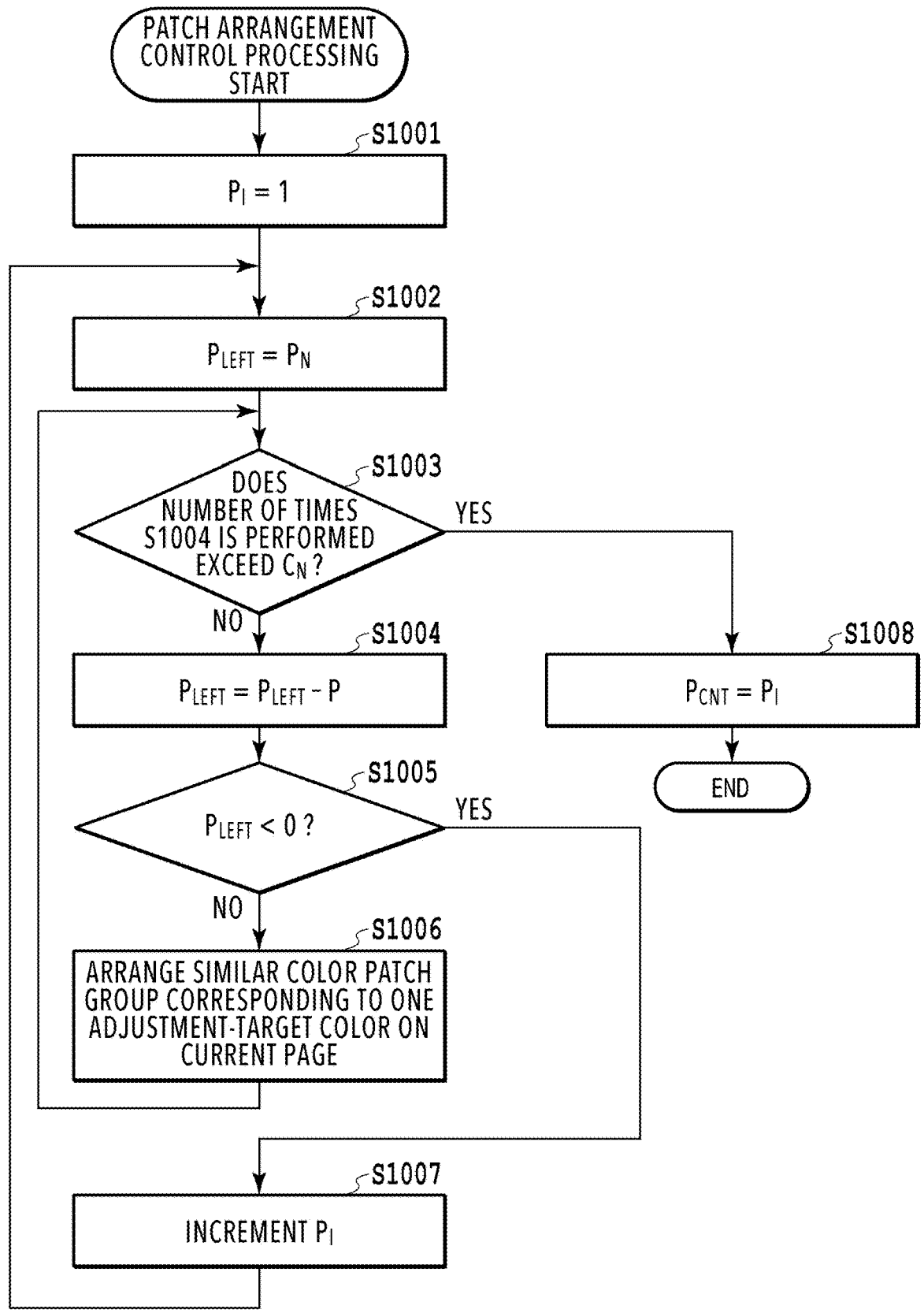
FIG. 10 is a flowchart showing a flow of patch arrangement control according to a second embodiment.

FIG. 10 is a flowchart showing the flow of the patch arrangement control according to the present embodiment. In the following, by taking the case shown in FIG. 9A and FIG. 9B described previously as an example, the patch arrangement control of the present embodiment is explained along the flowchart in FIG. 10. In the following explanation, it is assumed that a user has specified three colors as adjustment-target colors and the total number of adjustment-target colors $C_N$ is three. At S1001, a current page number $P_I$ is initialized. Specifically, as the initial value of the variable $P_I$, "1" is set. At S1002 that follows, a number of patches $P_{LEFT}$ that can be arrange on the current page is reset. Specifically, as the value of the variable $P_{LEFT}$, the value of the number of patches $P_N$ to be arranged on the same page is set. Here, it is assumed that the number of patches $P_N$ to be arranged on the same page is 16.

At S1003, whether or not the process at next S1004 is performed the number of times exceeding the total number of adjustment-target colors $C_N$ is determined. In a case where the number of times S1004 is performed does not exceed the total number of adjustment-target colors $C_N$, the processing advances to S1004, and in a case where the total number of adjustment-target colors $C_N$ is exceeded, the processing advances to S1007. In the stage immediately after the start of the processing, the total number of adjustment-target colors $C_N$ is not exceeded, and therefore, the processing advances to S1004 without exception.

At S1004, the value of $P_{LEFT}$ is updated by subtracting the number of patches P per adjustment-target color from the number of patches $P_{LEFT}$ that can be arranged on the current page corresponding to the page number $P_I$. For example, in a case where the number of patches P per adjustment-target color is six, in the stage of arrangement of the similar color patch group for the first adjustment-target color, the current page is the first page, and therefore, $P_{LEFT}$=16−6=10.

At S1005, whether $P_{LEFT}$ after S1004 is performed is a negative value is determined. In a case where $P_{LEFT}$ is not a negative value, the processing advances to S1006 and in a case where $P_{LEFT}$ is a negative value, the processing advances to S1007.

At S1006, within the current page, each patch configuring the similar color patch group for the adjustment-target color of interest is arranged. After completing arrangement of the similar color patch group corresponding to one adjustment-target color, the processing returns to S1003. As described above, in the stage in which the similar color patch group for the first adjustment-target color is arranged, $P_{LEFT}$ is 16−6=10 and for the second adjustment-target color, $P_{LEFT}$ becomes 10−6=4, and for the third adjustment-target color, $P_{LEFT}$ becomes 4−6=−2. Consequently, until the arrangement of the similar color patch group for the second adjustment-target color, S1003 to S1006 are repeated and at the point in time at which the similar color patch group for the third adjustment-target color is arranged, the processing advances to S1007. This means that the similar color patch groups for the first and second adjustment-target colors are arranged on the same page, but the similar color patch group for the third adjustment-target color is arranged on a different page.

At S1007, the value of the current page number $P_I$ is incremented (+1). After the increment of $P_I$, the processing returns to S1002 and the number of patches $P_{LEFT}$ that can be arranged on the current page is reset again. Here, at the point in time at which the similar color patch group for the third adjustment-target color is arranged, the value of the current page number $P_I$ is incremented and $P_I$ becomes 2. Then, the number of patches $P_{LEFT}$ that can be arranged on the second page, which is the current page, is reset again and $P_{LEFT}$ becomes 16. Then, the processing advances to S1003 and at this point in time, the number of times S1004 is performed is "3" and this does not exceed the total number of adjustment-target colors $C_N$, and therefore, the processing advances to S1004. Then, $P_{LEFT}$ becomes 16−6=10 and the processing advances to S1006 again and each patch configuring the similar color patch group for the third adjustment-target color is arranged on the second page. After that, at the time in point at which the processing returns to S1003 again, the number of times S1004 is performed is "4" and this exceeds the total number of adjustment-target colors $C_N$, and therefore, the processing advances to S1008.

Figure 11A:
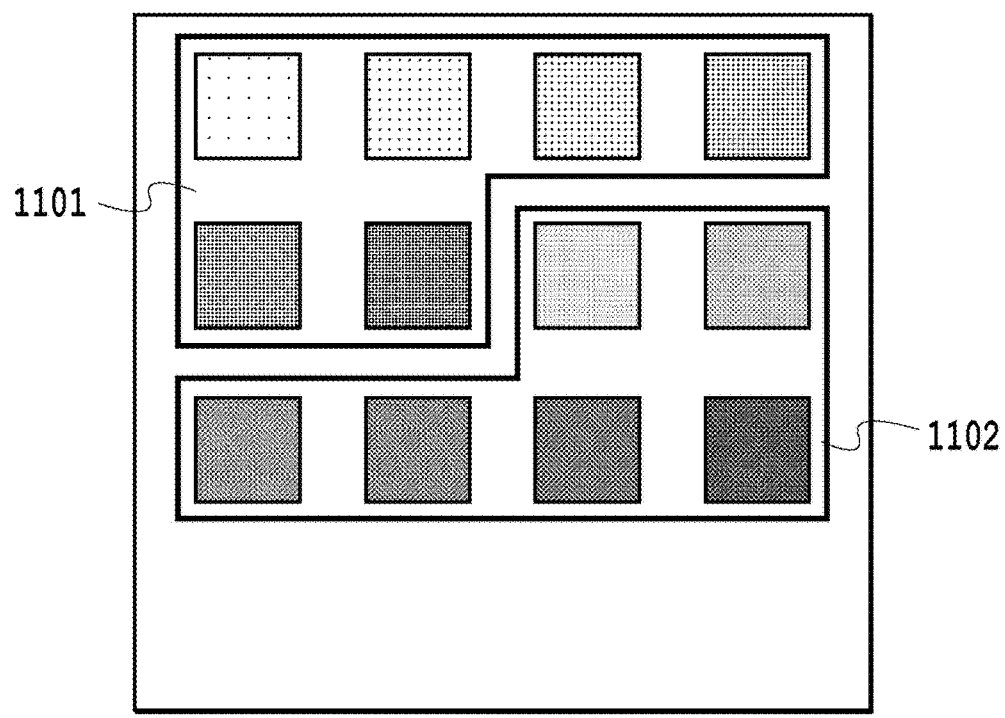
FIG. 11A and FIG. 11B are diagrams explaining an effect of the second embodiment.
Figure 11B:
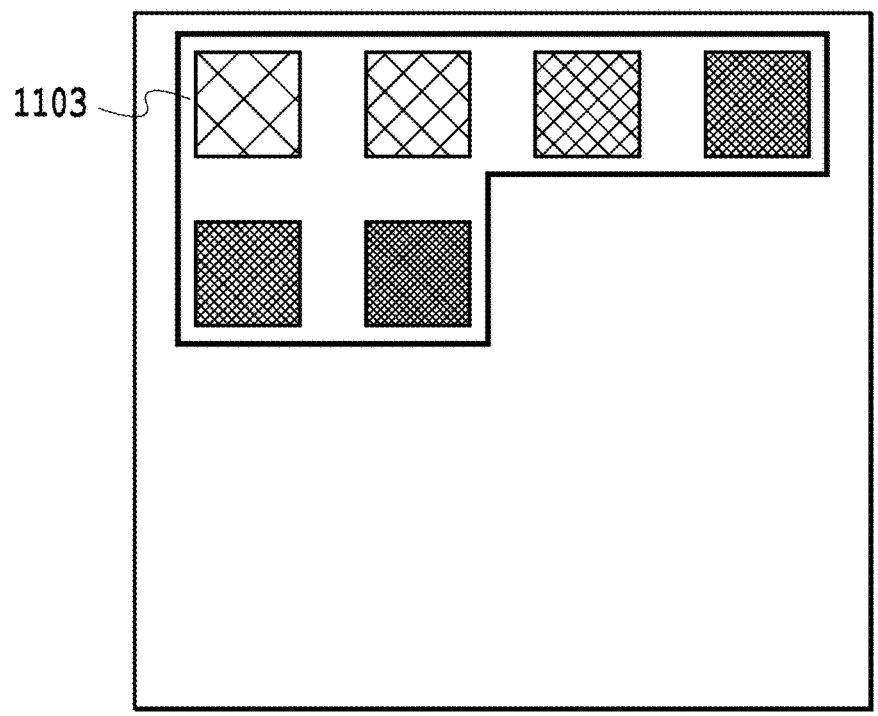

At S1008, as the value of the current number of pages $P_{CNT}$, the value of the current page number $P_I$ is set. In the example described above, $P_{CNT}$ becomes 2, and therefore, the two charts as shown in FIG. 11A and FIG. 11B are printed and output. On the chart of the first page shown in FIG. 11A, a similar color patch group 1101 for the first adjustment-target color and a similar color patch group 1102 for the second adjustment-target color are formed. Then, on the chart of the second page shown in FIG. 9B, a similar color patch group 1103 for the third adjustment-target color is formed. In this manner, the similar color patch group is formed for each adjustment-target color.

The above is the contents of the patch arrangement control according to the present embodiment.

Modification Example

It may also be possible to prevent the similar color patch group for the same adjustment-target color from being printed across different pages by changing the size of the patch in accordance with the total number of specified adjustment-target colors in place of switching pages as described above. That is, the larger the total number of specified adjustment-target colors, the smaller the size of each patch configuring the similar color patch group is made so that each patch belonging to the same similar color patch group is included within the same page. At this time, it is desirable to prevent the patch from becoming too small by determining in advance the allowable minimum size of each patch and switching pages in a case where the size becomes smaller than the minimum size.

According to the present embodiment, it is guaranteed that the similar color patch group for the same adjustment-target color is formed on the same surface of the same page, and therefore, it is made easier for a user to compare patches at the time of selecting the destination color.

Third Embodiment

In the first and second embodiments, it is necessary to perform the work to specify a plurality of adjustment-target colors, for a user to visually check a chart on which the similar color patch group is formed for each adjustment-target color, and to select the patch of the destination color for each individual printing-target image. However, there is a case where it is desired to use the same destination color also for a different printing-target image. For example, there is a case where it is desired to use the same light blue also in each printing-target image for the dark blue portion within a plurality of printing-target images. In such a case, with the method of the first and second embodiment, it is necessary to select the same light blue patch each time from the similar color patch group for each printing-target image and this requires time and effort of a user.

Consequently, an aspect is explained as a third embodiment in which information on a color relating to setting is saved and registered at the time of the setting of a destination color and thereby it is made possible to quickly set the same destination color used in the past by referring to the information already registered at the time of the next and subsequent adjustment-target color setting. Explanation of the contents in common to those of the preceding embodiments is omitted or simplified and in the following, different points are explained mainly.

<Use of Registered Information on Destination Color>

Figure 12A:
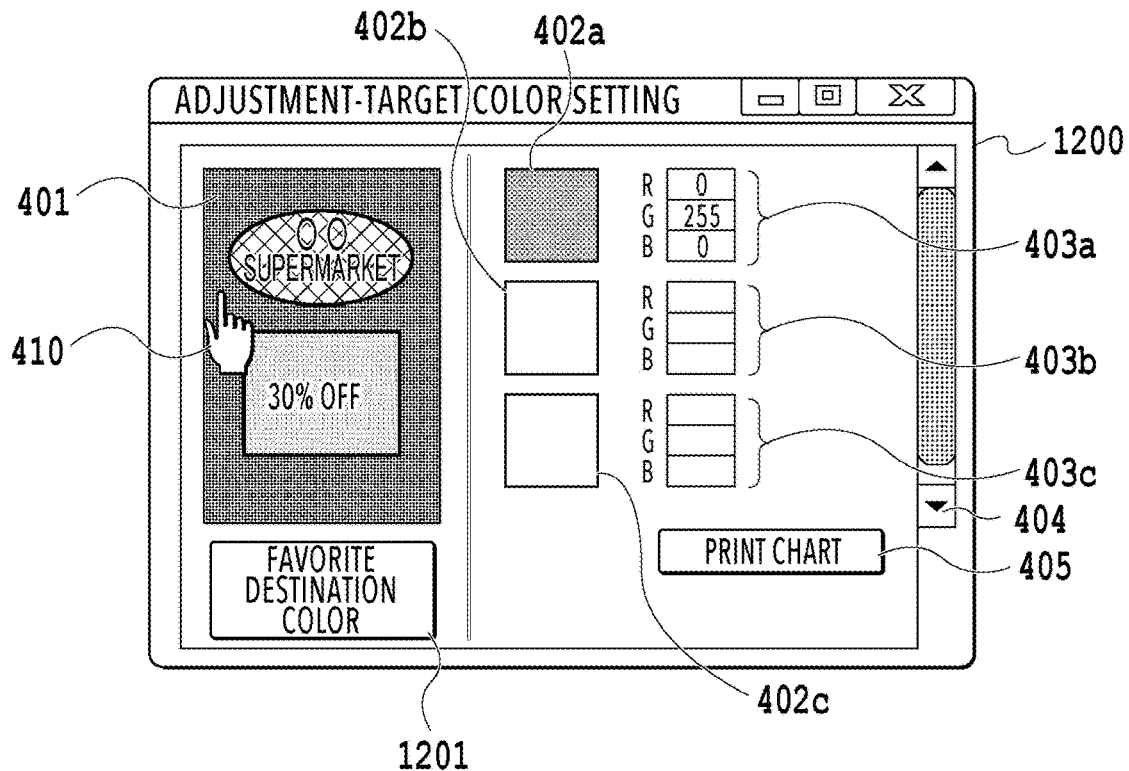
FIG. 12A and FIG. 12B are each a diagram showing an example of an adjustment-target color setting UI screen according to a third embodiment.
Figure 12B:
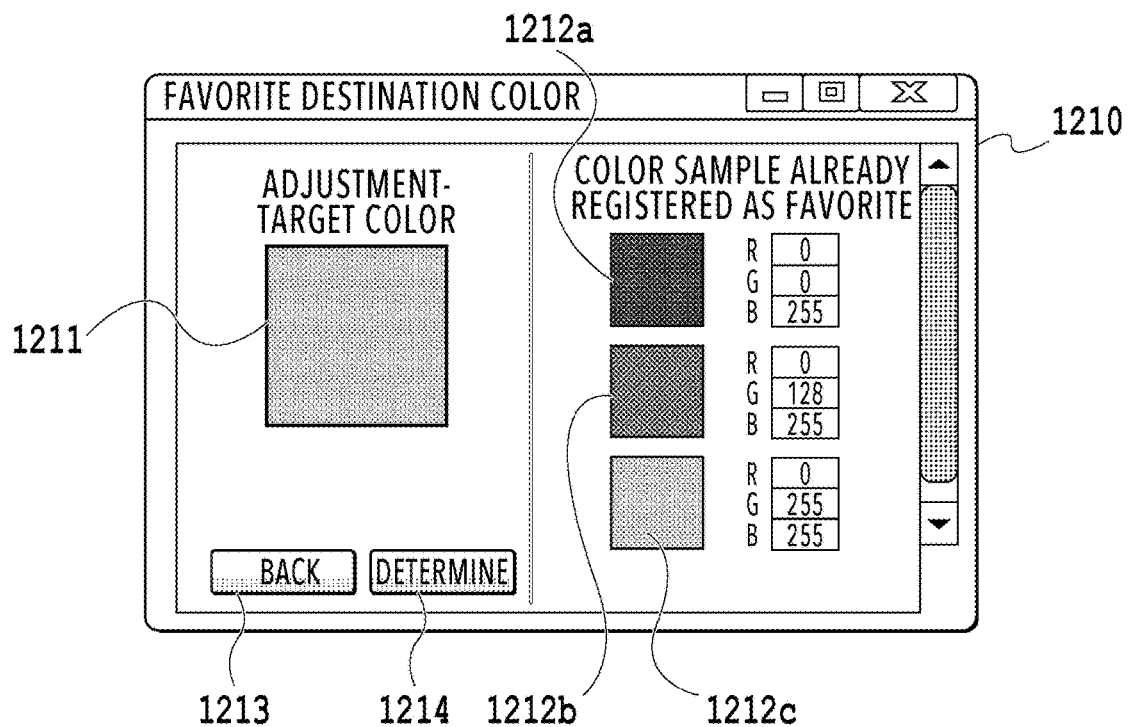

First, a method is explained in which a user quickly sets the destination color following the setting of the adjustment-target color by using information on the destination color registered as a favorite and used in the past. FIG. 12A is an example of an adjustment-target color setting UI screen that is displayed on the UI unit 105 in the present embodiment. An adjustment-target color setting UI screen 1200 is displayed at S301 in the flowchart in FIG. 3 described previously. The difference from the adjustment-target color setting UI screen 400 shown in FIG. 4A of the first embodiment lies in that a "Favorite destination color" button 1201 is added. In a case where a user who desires to use the destination color again, which is used in the past and already registered as a favorite presses down the "Favorite destination color" button 1201, the display of the UI unit 105 makes a transition into a selection UI screen 1210 shown in FIG. 12B. The "Favorite destination color" button 1201 is grayed-out-displayed and cannot be pressed down in the state where no adjustment-target color is specified.

In a display area 1211 on the selection UI screen 1210, a color sample of the adjustment-target color specified by a user is displayed. Then, to the right of the display area 1211, color samples (here, three color samples 1212a to 1212c) of the destination colors registered as favorites by a user before are displayed in a list along with RGB values thereof. By pressing down a "Determine" button 1214 after selecting any one color from among the color samples 1212a to 1212c, it is possible for a user to set the color, which is the destination color of the specified adjustment-target color. A "Back" button 1213 is a button to return the display to the adjustment-target color setting UI screen 1200 in a case where the color desired to be used is not registered as a favorite or the like.

As described above, it is possible for a user to easily set the destination color from the past use history information. In a case where a destination color is set via the selection UI screen 1210, it is not necessary to form the similar color patch group of the adjustment-target color corresponding to the destination color on a chart. Because of this, at the time of calculating the total number of patches $P_{SUM}$ described previously, the similar color patch of the adjustment-target color is not counted (the number of similar color patches corresponding to the adjustment-target color is subtracted). Then, in the conversion characteristic change processing described previously (S309, flow in FIG. 8), processing (S803) to rewrite the devRGB values corresponding to the sRGB values of the adjustment-target color of interest by the devRGB values of the destination color selected by a user from among the registered favorites is performed.

<Registration of Destination Color as Favorite>

Figure 13A:
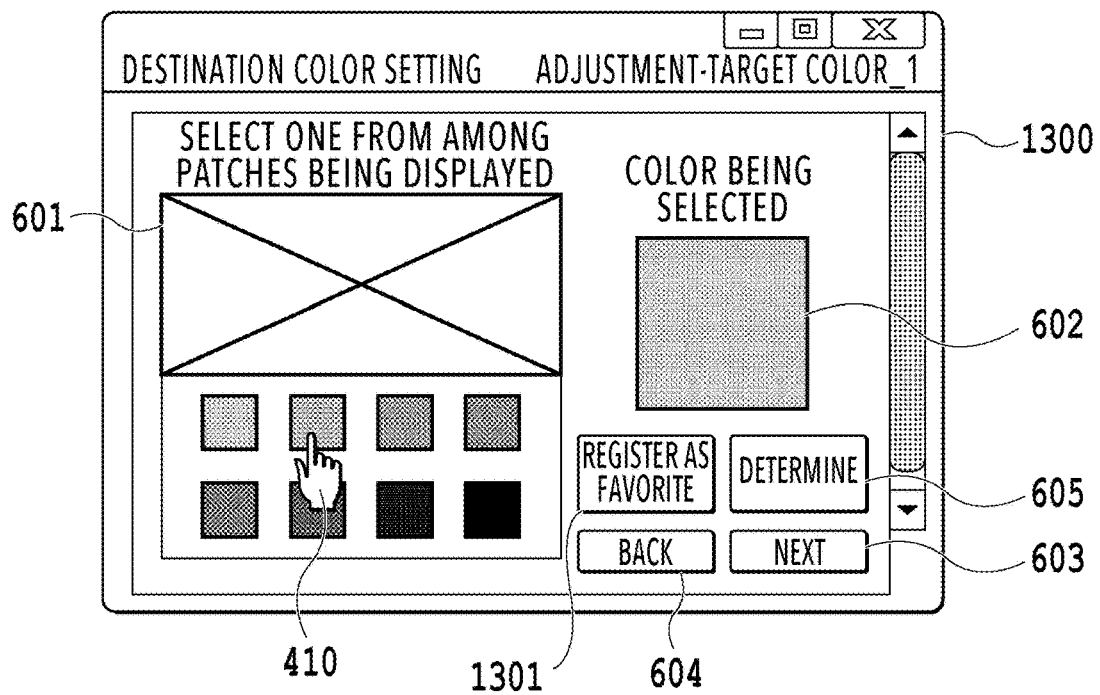
FIG. 13A and FIG. 13B are each a diagram showing an example of a destination color setting UI screen according to the third embodiment.
Figure 13B:
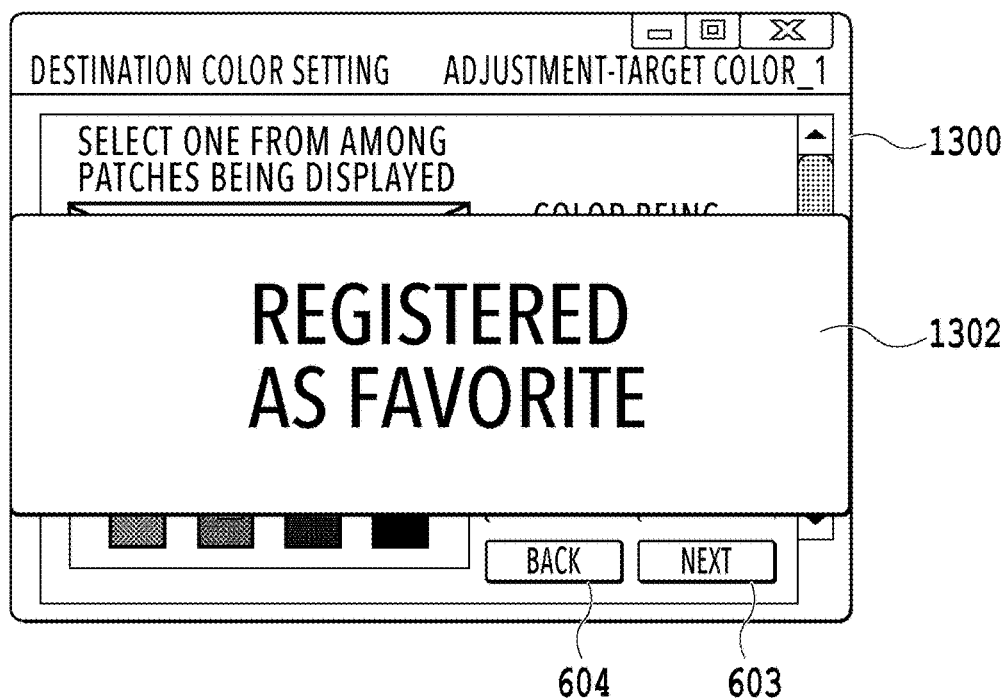

Following the above, registration of a destination color as a favorite is explained. FIG. 13A is an example of a destination color setting UI screen that is displayed on the UI unit 105 in the present embodiment. A destination color setting UI screen 1300 is displayed at S306 in the flowchart in FIG. 3 described previously. The difference from the destination color setting UI screen 600 shown in FIG. 6A of the first embodiment lies in that a "Favorite registration" button 1301 is added. In a case where a user who desires to use the color of the patch currently being selected as the destination color also in anther printing-target image presses down the "Favorite registration" button 1301, information (sRGB values) specifying the color of the patch currently being selected is saved in the large-capacity storage unit 104 or the like in association with the patch. At this time, as shown in FIG. 13B, a message 1302 indicating the fact is pop-up-displayed or the like on the destination color setting UI screen 1300, and thereby, a user is notified of the fact of registration. Then, in a case where a predetermined time elapses after the notification such as this, the message 1302 disappears from the UI unit 105. The "Favorite registration" button 1301 is grayed-out-displayed and cannot be pressed down in the state where no patch is selected from among the similar color patch group currently being displayed.

By the processing as above, it is possible for a user to register a specific color having the possibility of being used as a destination color in the future.

According to the present embodiment, it is possible for user to set a destination color for an adjustment-target color more efficiently.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technology of the present disclosure, in a case where a destination color is set for each of a plurality of adjustment-target colors within a printing-target image, it is not necessary to repeat the series of work of "specification of adjustment-target color", "printing of chart on which similar color patches are arranged", and "selection of patch of destination color" for each color. Due to this, convenience of a user improves.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-130226, filed Jul. 12, 2019, which is hereby incorporated by reference wherein in its entirety.

What is claimed is:

1. A control method of an image forming apparatus that forms an image based on an input image, the control method comprising:

a first display step of displaying a UI screen for causing a user to determine a first adjustment-target color and a second adjustment-target color different from the first adjustment-target color from among colors included in the input image;

a forming step of forming a first patch group including patches in a plurality of colors similar to the first adjustment-target color and a second patch group including patches in a plurality of colors similar to the second adjustment-target color;

a second display step of displaying a UI screen for causing a user to select one patch from among the formed first patch group and one patch from among the formed second patch group, respectively; and a determination step of determining a first destination color, which is a conversion destination of the first adjustment-target color, based on the one patch selected from among the first patch group and determining a second destination color, which is a conversion destination of the second adjustment-target color, based on the one patch selected from among the second patch group.

2. The control method according to claim 1, wherein at the forming step, the first patch group and the second patch group are formed on the same surface of the same page.

3. A control method of an image forming apparatus that forms an image based on an input image, the control method comprising:

a first display step of displaying a UI screen for causing a user to determine a plurality of adjustment-target colors from among colors included in the input image;

a forming step of forming, by focusing attention on each of the plurality of adjustment-target colors, a respective patch group including patches in a plurality of colors similar to the adjustment-target color on which attention is focused on;

a second display step of displaying a UI screen for causing a user to select each one patch for each of the formed patch groups; and a determination step of determining a respective destination color, which is a conversion destination of each of the plurality of adjustment-target colors, based on each of the selected patches.

4. The control method according to claim 3, wherein at the forming step, the same number of patch groups as the number of adjustment-target colors is formed on the same surface of the same page.

5. The control method according to claim 3, further comprising:

a step of determining a size of each patch included in a patch group to be formed in accordance with the number of adjustment-target colors.

6. The control method according to claim 3, further comprising:

a step of generating a table for converting the plurality of adjustment-target colors into each of the determined destination colors.

7. The control method according to claim 3, wherein the second display step further includes a step of saving information on a patch selected by a user, wherein a UI screen that is displayed at the first display step is configured so that a user can specify a color used in the past as a destination color as a destination color for the adjustment-target color based on the saved information.

8. An image forming apparatus that forms an image based on an input image, comprising:

at least one memory that stores a program; and at least one processor that executes the program to perform:

controlling to display a UI screen for causing a user to determine a first adjustment-target color and a second adjustment-target color different from the first adjustment-target color from among colors included in the input image and further display a UI screen for causing a user to select one patch from among a first patch group including patches in a plurality of colors similar to the first adjustment-target color and one patch from among a second patch group including patches in a plurality of colors similar to the second adjustment-target color, respectively; and determining a first destination color, which is a conversion destination of the first adjustment-target color, based on one patch selected from among the first patch group and determining a second destination color, which is a conversion destination of the second adjustment-target color, based on one patch selected from among the second patch group.

9. The image forming apparatus according to claim 8, wherein the at least one processor executes the program to further perform:

outputting a chart on which the first patch group and the second patch group are formed on the same surface of the same page.

10. An image forming apparatus that forms an image based on an input image, comprising:

at least one memory that stores a program; and at least one processor that executes the program to perform:

controlling to display a first UI screen for causing a user to determine a plurality of adjustment-target colors from among colors included in the input image and further display, by focusing attention on each of the plurality of adjustment-target colors, a second UI screen for causing a user to select one patch from among a patch group including patches in a plurality of colors similar to the adjustment-target color on which attention is focused on; and determining a destination color, which is a conversion destination of each of the plurality of adjustment-target colors, based on one patch selected for each of the plurality of adjustment-target colors.

11. The image forming apparatus according to claim 10, wherein the at least one processor executes the program to further perform:

outputting a chart on which the same number of patch groups as the number of adjustment-target colors is formed on the same surface of the same page.

12. The image forming apparatus according to claim 10, wherein the at least one processor executes the program to further perform:

determining a size of each patch included in a patch group to be formed in accordance with the number of adjustment-target colors.

13. The image forming apparatus according to claim 10, wherein the at least one processor executes the program to further perform:

generating a table for converting the plurality of adjustment-target colors into each of the determined destination colors.

14. The image forming apparatus according to claim 10, wherein information on a patch selected by a user via the second UI screen is saved and the first UI screen is displayed, which is configured so that a user can specify a color used in the past as a destination color as a destination color for the adjustment-target color based on the saved information.

15. A non-transitory computer readable storage medium storing a program for causing a computer to perform a control method of an image forming apparatus that forms an image based on an input image, the control method comprising:

a first display step of displaying a UI screen for causing a user to determine a first adjustment-target color and a second adjustment-target color different from the first adjustment-target color from among colors included in the input image;

a forming step of forming a first patch group including patches in a plurality of colors similar to the first adjustment-target color and a second patch group including patches in a plurality of colors similar to the second adjustment-target color;

a second display step of displaying a UI screen for causing a user to select one patch from among the formed first patch group and one patch from among the formed second patch group, respectively; and a determination step of determining a first destination color, which is a conversion destination of the first adjustment-target color, based on the one patch selected from among the first patch group and determining a second destination color, which is a conversion destination of the second adjustment-target color, based on the one patch selected from among the second patch group.

* * * * *